United States Patent
Ye et al.

(10) Patent No.: US 10,419,816 B2
(45) Date of Patent: Sep. 17, 2019

(54) VIDEO-BASED CHECK-IN METHOD, TERMINAL, SERVER AND SYSTEM

(71) Applicant: Tencent Technology (Shenzhen) Company Limited, Shenzhen, Guangdong (CN)

(72) Inventors: Wa Ye, Shenzhen (CN); Zhenyu Xu, Shenzhen (CN); Qiuming Zheng, Shenzhen (CN); Bo Sun, Shenzheng (CN); Jing Zang, Shenzhen (CN); Rui Wang, Shenzhen (CN); Zhuo Tang, Shenzhen (CN); Hongyang Wang, Shenzhen (CN); Keren Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 4 days.

(21) Appl. No.: 15/379,030

(22) Filed: Dec. 14, 2016

(65) Prior Publication Data
US 2017/0094350 A1    Mar. 30, 2017

Related U.S. Application Data

(63) Continuation of application No. PCT/CN2015/082192, filed on Jun. 24, 2015.

(30) Foreign Application Priority Data

Jun. 27, 2014    (CN) .......................... 2014 1 0299836

(51) Int. Cl.
*H04N 21/442* (2011.01)
*H04N 21/25* (2011.01)
(Continued)

(52) U.S. Cl.
CPC ....... *H04N 21/44204* (2013.01); *H04L 67/24* (2013.01); *H04N 21/252* (2013.01); *H04N 21/4788* (2013.01); *H04N 21/6582* (2013.01)

(58) Field of Classification Search
CPC .................. H04N 21/44204; H04N 21/4788
See application file for complete search history.

(56) References Cited

U.S. PATENT DOCUMENTS 8,538,239 B2    9/2013 Ikizyan et al.
8,621,504 B2    12/2013 Reynolds et al.
(Continued)

FOREIGN PATENT DOCUMENTS

CN    102055804 A    5/2011
CN    102843599 A    12/2012
(Continued)

OTHER PUBLICATIONS

International Search Report & Written Opinion of the ISA for PCT/CN2015/082192, Haidian District, Beijing, dated Sep. 2, 2015.
(Continued)

*Primary Examiner* — Yassin Alata
(74) *Attorney, Agent, or Firm* — Brinks Gilson & Lione

(57) ABSTRACT

A video-based check-in method, terminal, and server are provided. The method includes: obtaining a check-in instruction; collecting multimedia data corresponding to a currently played video; determining time information corresponding to the multimedia data; sending the multimedia data and the time information to a server; receiving a check-in manner sent after the server determines according to the multimedia data and the time information that a user is watching the video; and displaying the check-in manner, and completing check-in on the video according to the check-in manner.

15 Claims, 15 Drawing Sheets

(51) Int. Cl.
  *H04N 21/4788*  (2011.01)
  *H04N 21/658*  (2011.01)
  *H04L 29/08*  (2006.01)

(56) References Cited

U.S. PATENT DOCUMENTS

| | | | |
|---|---|---|---|
| 9,185,338 | B2 | 11/2015 | Ikizyan et al. |
| 2009/0287411 | A1* | 11/2009 | Sweeney ............... H04L 63/20 |
| | | | 701/469 |
| 2011/0247042 | A1* | 10/2011 | Mallinson ......... G06F 17/30026 |
| | | | 725/86 |
| 2013/0145390 | A1* | 6/2013 | Sillerman ........ H04N 21/42203 |
| | | | 725/18 |
| 2013/0152139 | A1 | 6/2013 | Davis et al. |
| 2013/0163957 | A1 | 6/2013 | Ikizyan et al. |
| 2013/0330057 | A1 | 12/2013 | Ikizyan et al. |
| 2016/0275588 | A1 | 9/2016 | Ye et al. |
| 2016/0337717 | A1 | 11/2016 | Ye et al. |

FOREIGN PATENT DOCUMENTS

| | | |
|---|---|---|
| CN | 102905172 A | 1/2013 |
| CN | 104113782 A | 10/2014 |
| KR | 20130079123 A | 7/2013 |
| WO | WO-2015188620 A1 | 12/2015 |

OTHER PUBLICATIONS

Office Action regarding South Korean Patent Application No. 10-2017-700951, dated Jun. 27, 2018. Translation provided by Unitalen Attorneys at Law.

* cited by examiner

VIDEO-BASED CHECK-IN METHOD, TERMINAL, SERVER AND SYSTEM

CROSS REFERENCE TO RELATED APPLICATION

This application is a continuation of International Application No. PCT/CN2015/082192, filed on Jun. 24, 2015, which claims priority to Chinese Patent Application No. 201410299836.6, filed on Jun. 27, 2014, which are hereby incorporated by reference in their entireties.

FIELD OF THE TECHNOLOGY

The present disclosure relates to the field of Internet technologies, and in particular, to a video-based check-in method, terminal, server and system.

BACKGROUND OF THE DISCLOSURE

With quick development of Internet technologies, a check-in function is launched in many Internet applications, and check-in of a user in an Internet application denotes that the user has already browsed or used the application. For example, if a user performs check-in on a webpage, it indicates that the user has already browsed the webpage; if a user performs check-in on an application, it indicates that the user has already used the application. Video-based check-in refers to that a behavior in which a user interacts, by using a corresponding terminal, with a video being currently played by a video playback device such as a television, thereby performing check-in on the video, so as to indicate that the user has watched the video. By using the video-based check-in, a response of the user to the video can be obtained, thereby promoting video-based audience interaction. For example, if a quantity of users performing check-in on a video is large, it indicates that the video is comparatively popular.

In a related technology, when video-based check-in is performed, a used method is that: a terminal obtains check-in data that is input by a user and is about check-in performed on a video being played, and completes check-in on the video by sending the check-in data to a server. The check-in data is data edited according to a check-in manner of performing check-in on the video after the user corresponding to the terminal determines the check-in manner. For example, if the user determines that the check-in manner of performing check-in on the video is to send a check-in short message service message to the server, the terminal completes check-in on the video by obtaining the check-in short message service message, and by sending the check-in short message service message to the server.

In the related technology, when video-based check-in is performed, a terminal obtains check-in data corresponding to a video check-in manner, and sends the obtained check-in data to a server to complete check-in on a video; after obtaining the video check-in manner, the terminal may obtain the check-in data anytime and anywhere, or even may receive check-in data forwarded by another terminal, and therefore, a video-based check-in method provided in the related technology allows the terminal to perform check-in anytime and anywhere by default. In this situation, even a user who does not watch the video may also perform check-in on the video by using a corresponding terminal, so that authenticity of check-in data obtained by performing check-in on the video is not high, and thereby reliability of a response of the user to the video obtained according to the check-in data is not high.

SUMMARY

In view of this, embodiments of the present invention provide a video-based check-in method, terminal, server and system. The technical solutions are as follows:

According to an aspect, a video-based check-in method is provided, including:
obtaining a check-in instruction;
collecting multimedia data corresponding to a currently played video according to the check-in instruction;
determining time information corresponding to the multimedia data;
sending the multimedia data and the time information corresponding to the multimedia data to a server;
receiving a check-in manner corresponding to the video sent after the server determines according to the multimedia data and the time information corresponding to the multimedia data that a user is watching the video; and
displaying the check-in manner, and completing check-in on the video according to the check-in manner.

According to another aspect, a video-based check-in method is provided, including: receiving multimedia data sent by a terminal and time information corresponding to the multimedia data, the multimedia data being multimedia data corresponding to a currently played video and collected by the terminal according to a check-in instruction;
determining whether a user corresponding to the terminal is watching the video according to the multimedia data and the time information corresponding to the multimedia data; and
sending, if it is determined that the user corresponding to the terminal is watching the video, a check-in manner corresponding to the video to the terminal, so that the terminal completes check-in on the video according to the check-in manner.

According to another aspect, a video-based check-in terminal is provided, including:
a first obtaining module, configured to obtain a check-in instruction;
a collecting module, configured to collect multimedia data corresponding to a currently played video according to the check-in instruction;
a determining module, configured to determine time information corresponding to the multimedia data;
a sending module, configured to send the multimedia data and the time information corresponding to the multimedia data to a server;
a first receiving module, configured to receive a check-in manner corresponding to the video sent after the server determines according to the multimedia data and the time information corresponding to the multimedia data that a user is watching the video; and
a first display module, configured to display the check-in manner, and complete check-in on the video according to the check-in manner.

According to another aspect, a video-based check-in server is provided, including:
a first receiving module, configured to receive multimedia data sent by a terminal and time information corresponding to the multimedia data, the multimedia data being multimedia data corresponding to a currently played video and collected by the terminal according to a check-in instruction;

a first determining module, configured to determine whether a user corresponding to the terminal is watching the video according to the multimedia data and the time information corresponding to the multimedia data; and a first sending module, configured to send, when it is determined that the user corresponding to the terminal is watching the video, a check-in manner corresponding to the video to the terminal, so that the terminal completes check-in on the video according to the check-in manner.

Multimedia data corresponding to a currently played video is collected, time information corresponding to the multimedia data is determined, the multimedia data and the time information corresponding to the multimedia data are submitted to a server, and a check-in manner sent after the server determines according to the multimedia data and the time information corresponding to the multimedia data that a user is watching the video is received, thereby completing check-in according to the check-in manner, and ensuring that check-in is implemented on the basis that the user watches the video, so that check-in data obtained by using check-in has better authenticity, and thereby a response of the user to the video obtained according to the check-in data has better reliability.

BRIEF DESCRIPTION OF THE DRAWINGS

To describe technical solutions of embodiments of the present invention more clearly, the accompanying drawings for illustrating the embodiments will be introduced briefly in the following. Apparently, the drawings in the following description are only some embodiments of the present invention, and a person of ordinary skill in the art may obtain other drawings based on these accompanying drawings without creative efforts.

DESCRIPTION OF EMBODIMENTS

To make the objectives, technical solutions, and advantages of the present disclosure more comprehensible, the following further describes the embodiments of the present invention in detail with reference to the accompanying drawings.

Figure 1:
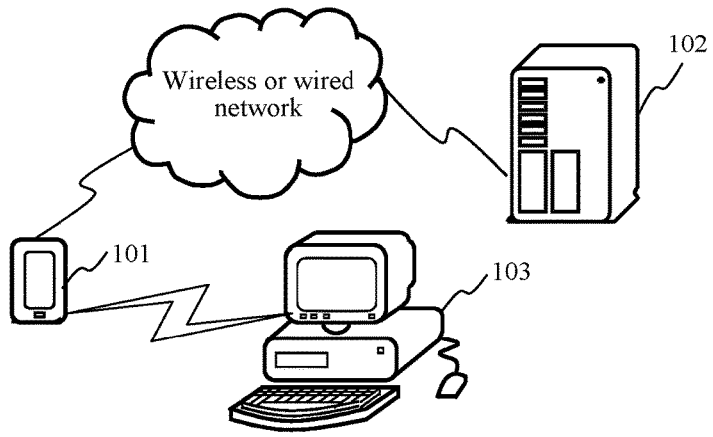
FIG. 1 illustrates a schematic diagram of an implementation environment involved in a video-based check-in method according to some embodiments of the present invention.

Referring to FIG. 1, FIG. 1 is a schematic diagram of an implementation environment involved in a video-based check-in method according to some embodiments of the present invention. As shown in FIG. 1, the implementation environment includes a terminal 101, a server 102 and a video playback device 103. The terminal 101 and the server 102 are connected by using a wired or wireless network, and the terminal 101 may collect multimedia data corresponding to a currently played video of the video playback device 103, and send the collected multimedia data to the server 102, and the server 102 receives the multimedia data sent by the terminal and then controls a user corresponding to the terminal 101 to perform check-in on the video.

The terminal 101 may include but is not limited to be a smartphone, a tablet computer, an e-book reader, an MP3 (Moving Picture Experts Group Audio Layer III) player, an MP4 (Moving Picture Experts Group Audio Layer IV) player, a laptop portable computer, a desktop computer, a remote control, or the like. The server 102 may be any type of server in which a video check-in management function is installed. The video playback device 103 may be a television, and may also be another device that can play a video in real time. Moreover, the terminal 101 and the server 102 may be devices independent of the video playback device 103, and may also be devices integrated with the video playback device 103, which is not limited in this embodiment of the present invention.

Figure 2:
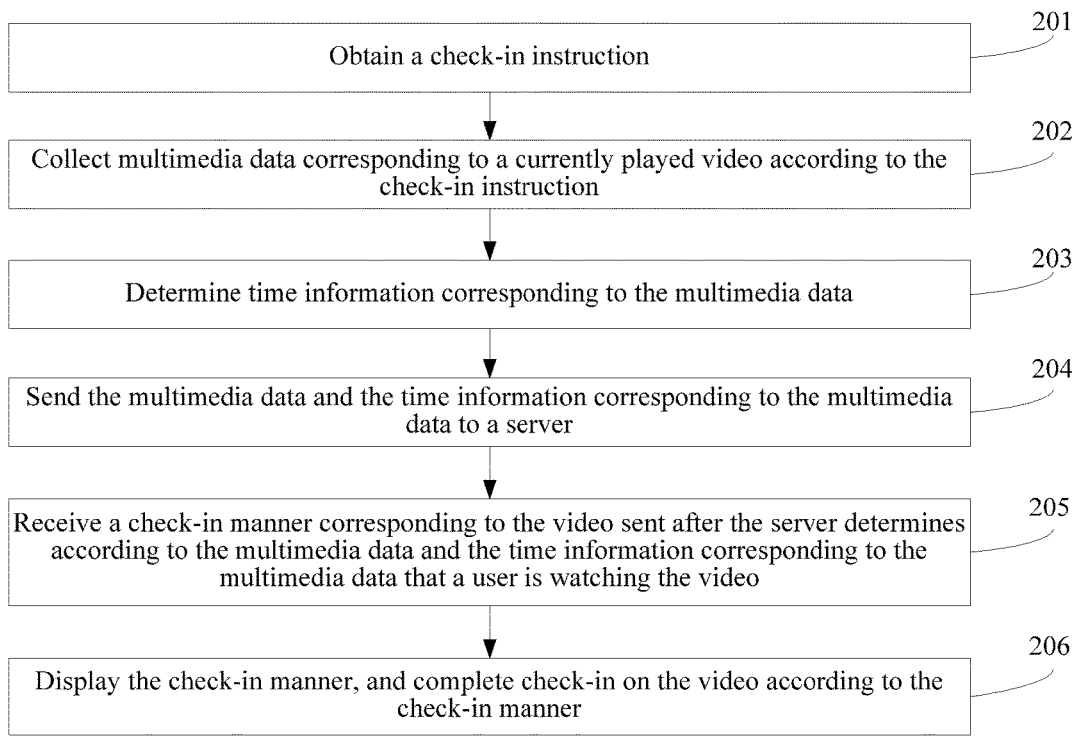
FIG. 2 illustrates a flowchart of a video-based check-in method according to some embodiments of the present invention.

For a specific video-based check-in method, reference is made to the following embodiments:

FIG. 2 is a flowchart of a video-based check-in method according to an exemplary embodiment. With reference to the schematic diagram of the implementation environment shown in FIG. 1 and the foregoing content, this embodiment of the present invention provides a video-based check-in method. The perspective from which a terminal performs the method provided in this embodiment of the present invention is used as an example. Referring to FIG. 2, a process of the method provided in this embodiments of the present invention includes:

201: Obtain a check-in instruction.

202: Collect multimedia data corresponding to a currently played video according to the check-in instruction.

203: Determine time information corresponding to the multimedia data.

Optionally, the collecting multimedia data corresponding to a currently played video according to the check-in instruction includes:

collecting multimedia data corresponding to the currently played video once in every preset time according to the check-in instruction; and the determining time information corresponding to the multimedia data includes:

determining time information corresponding to the multimedia data collected every time.

204: Send the multimedia data and the time information corresponding to the multimedia data to a server.

205: Receive a check-in manner corresponding to the video sent after the server determines according to the multimedia data and the time information corresponding to the multimedia data that a user is watching the video.

206: Display the check-in manner, and complete check-in on the video according to the check-in manner.

Optionally, the method further includes:

obtaining user information corresponding to the user, and submitting the user information to the server, so that the server updates statistical data related to the video according to the user information.

Optionally, after the submitting the user information to the server, the method further includes:

receiving friend information returned by the server according to the user information, the friend information including check-in information corresponding to a friend, in a friend relationship chain of the user, who has performed check-in on the video; and displaying the friend information.

Optionally, after the completing check-in on the video according to the check-in manner, the method further includes:

receiving comment information of the video returned by the server, the comment information being comment information published by a user who has performed check-in on the video.

Optionally, after the completing check-in on the video according to the check-in manner, the method further includes:

obtaining comment information published by the user on the video; and submitting the comment information to the server, so that the server delivers the comment information to a terminal corresponding to a friend, in a friend relationship chain of the user, who has performed check-in on the video.

In the method provided in this embodiment of the present invention, multimedia data corresponding to a currently played video is collected, time information corresponding to the multimedia data is determined, the time information corresponding to the multimedia data is submitted to a server, and a check-in manner sent after the server determines according to the multimedia data and the time information corresponding to the multimedia data that a user is watching the video is received, thereby completing check-in according to the check-in manner, and ensuring that check-in is implemented on the basis that the user watches the video, so that check-in data obtained by using check-in has better authenticity, and thereby a response of the user to the video obtained according to the check-in data has better reliability.

Figure 3:
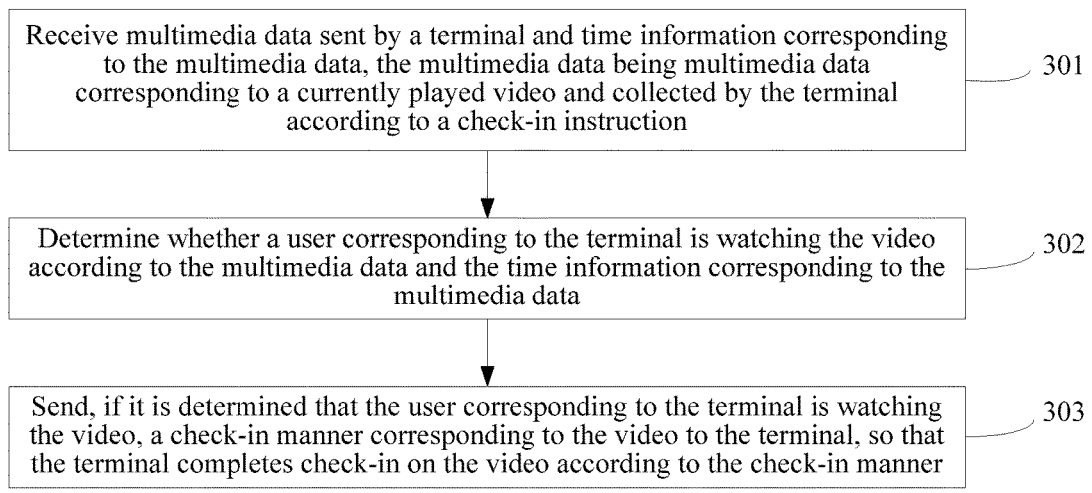
FIG. 3 illustrates a flowchart of a video-based check-in method according to some embodiments of the present invention.

FIG. 3 is a flowchart of a video-based check-in method according to an exemplary embodiment. With reference to the schematic diagram of the implementation environment shown in FIG. 1 and the foregoing content of the embodiment shown in FIG. 2, this embodiment of the present invention provides a video-based check-in method. The perspective from which a server performs the method provided in this embodiment of the present invention is used as an example. Referring to FIG. 3, a process of the method provided in this embodiments of the present invention includes:

301: Receive multimedia data sent by a terminal and time information corresponding to the multimedia data, the multimedia data being multimedia data corresponding to a currently played video and collected by the terminal according to a check-in instruction.

302: Determine whether a user corresponding to the terminal is watching the video according to the multimedia data and the time information corresponding to the multimedia data.

Optionally, the determining whether a user corresponding to the terminal is watching the video according to the multimedia data and the time information corresponding to the multimedia data includes:

determining whether the multimedia data is consistent with multimedia data corresponding to the video in the time information corresponding to the multimedia data; and determining, if the multimedia data is consistent with the multimedia data corresponding to the video in the time information corresponding to the multimedia data, that a user corresponding to the terminal is watching the video.

Optionally, the determining whether a user corresponding to the terminal is watching the video according to the multimedia data and the time information corresponding to the multimedia data includes:

generating, if the multimedia data is audio data, an audio fingerprint according to the audio data and time information corresponding to the audio data, and determining whether the audio fingerprint matches an audio fingerprint corresponding to the video; and determining, if the audio fingerprint matches the audio fingerprint corresponding to the video, that the user corresponding to the terminal is watching the video.

303: Send, if it is determined that the user corresponding to the terminal is watching the video, a check-in manner corresponding to the video to the terminal, so that the terminal completes check-in on the video according to the check-in manner.

Optionally, the method further includes:

receiving user information submitted by the terminal, and updating statistical data related to the video according to the user information.

Optionally, after the receiving user information submitted by the terminal, the method further includes:

obtaining a friend relationship chain of the user corresponding to the terminal according to the user information;

determining friend information corresponding to a friend in the friend relationship chain who has performed check-in on the video; and sending the friend information to the terminal, the friend information including check-in information corresponding to the friend, in the friend relationship chain of the user corresponding to the terminal, who has performed check-in on the video.

Optionally, after the sending a check-in manner corresponding to the video to the terminal, the method further includes:

returning comment information of the video to the terminal, the comment information being comment information published by a user who has performed check-in on the video.

Optionally, after the sending a check-in manner corresponding to the video to the terminal, the method further includes:

receiving comment information on the video obtained by the terminal after check-in is performed on the video; and delivering the comment information to a terminal corresponding to a friend, in a friend relationship chain of the user corresponding to the terminal, who has performed check-in on the video.

In the method provided in this embodiment of the present invention, multimedia data corresponding to a currently played video sent by a terminal and time information corresponding to the multimedia data are received, and thereby a check-in manner is sent after it is determined according to the multimedia data and the time information corresponding to the multimedia data that a user is watching a video, so that the terminal completes check-in according to the check-in manner after receiving the check-in manner. It is ensured that check-in is implemented on the basis that the user watches the video, so that check-in data obtained by using check-in has better authenticity, and thereby a response of the user to the video obtained according to the check-in data has better reliability.

Figure 4:
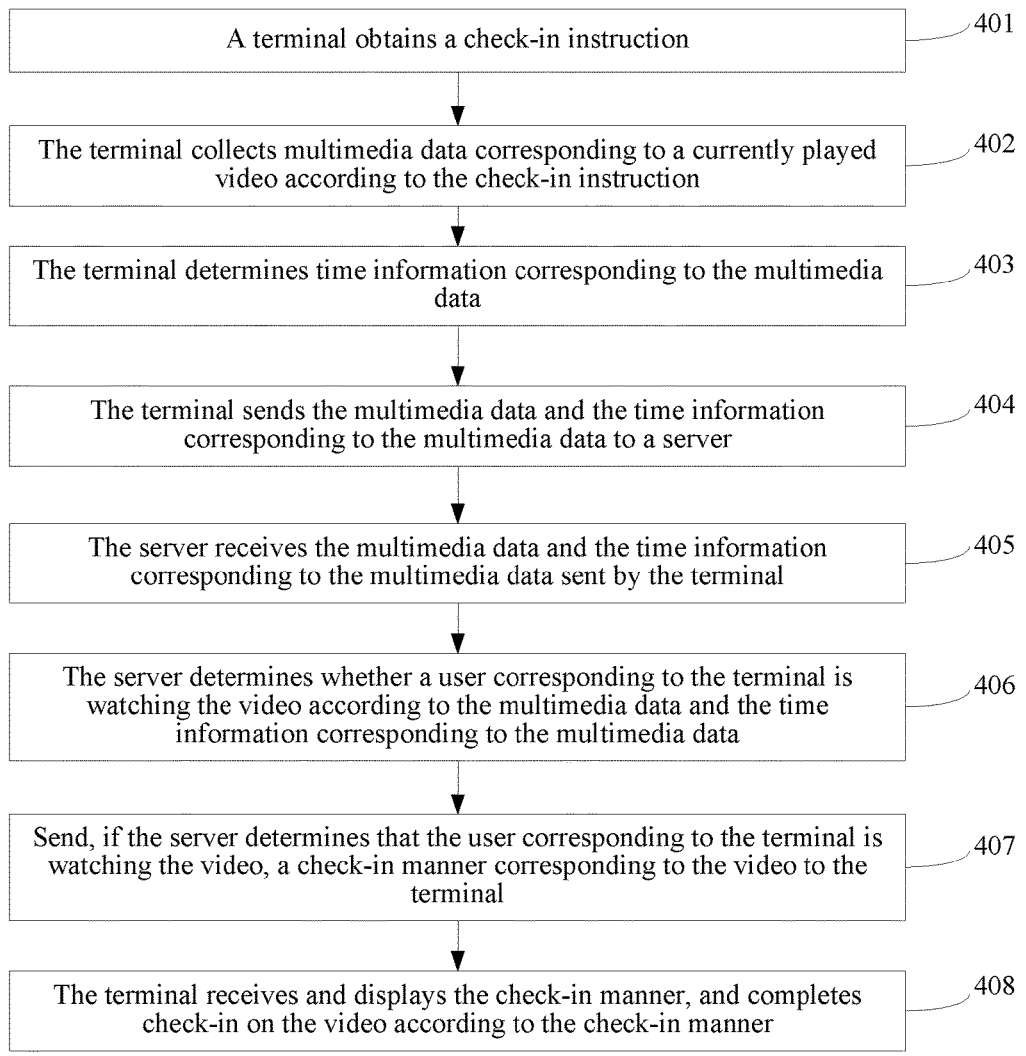
FIG. 4 illustrates a flowchart of a video-based check-in method according to some embodiments of the present invention.

FIG. 4 is a flowchart of a video-based check-in method according to an exemplary embodiment. With reference to the schematic diagram of the implementation environment shown in FIG. 1 and the foregoing content of the embodiment shown in FIG. 2 or FIG. 3, referring to FIG. 4, a process of the method provided in this embodiments of the present invention includes:

401: A terminal obtains a check-in instruction.

In order to trigger performing check-in on a video, a terminal needs to obtain a check-in instruction. A manner in which the terminal obtains the check-in instruction is not specifically limited in this embodiment of the present invention. During a specific implementation, the manner includes but is not limited to: determining whether a terminal detects a shaking action; and if the terminal detects a shaking action, determining that a check-in instruction is obtained. A specific determining condition on which whether the terminal detects a shaking action is determined is not limited in this embodiment. During a specific implementation, the specific determining condition includes but is not limited to: if the terminal itself includes a location sensor, detecting whether a gravity center location of the terminal changes by using the location sensor, and if it is detected by using the location sensor that the gravity center location of the terminal changes, determining that the terminal detects a shaking action.

Certainly, besides the foregoing method for obtaining a check-in instruction, a specific method for a terminal to obtain a check-in instruction further may be: if the terminal detects a preset fingerprint, determining that a check-in instruction is obtained; if the terminal detects a preset password, determining that a check-in instruction is obtained; or the like.

Optionally, in order to prevent the check-in instruction in the method provided in this embodiment from being the same as another functional instruction of the terminal, thereby mistakenly considering another functional instruction as the check-in instruction in the method provided in this embodiment, the terminal may learn that a check-in instruction triggering condition is triggered and then obtain the check-in instruction. A specific method for triggering the check-in instruction triggering condition is not limited in this embodiment. For example, if a check-in function is enabled, it is determined that the check-in instruction triggering condition is triggered.

Figure 5:
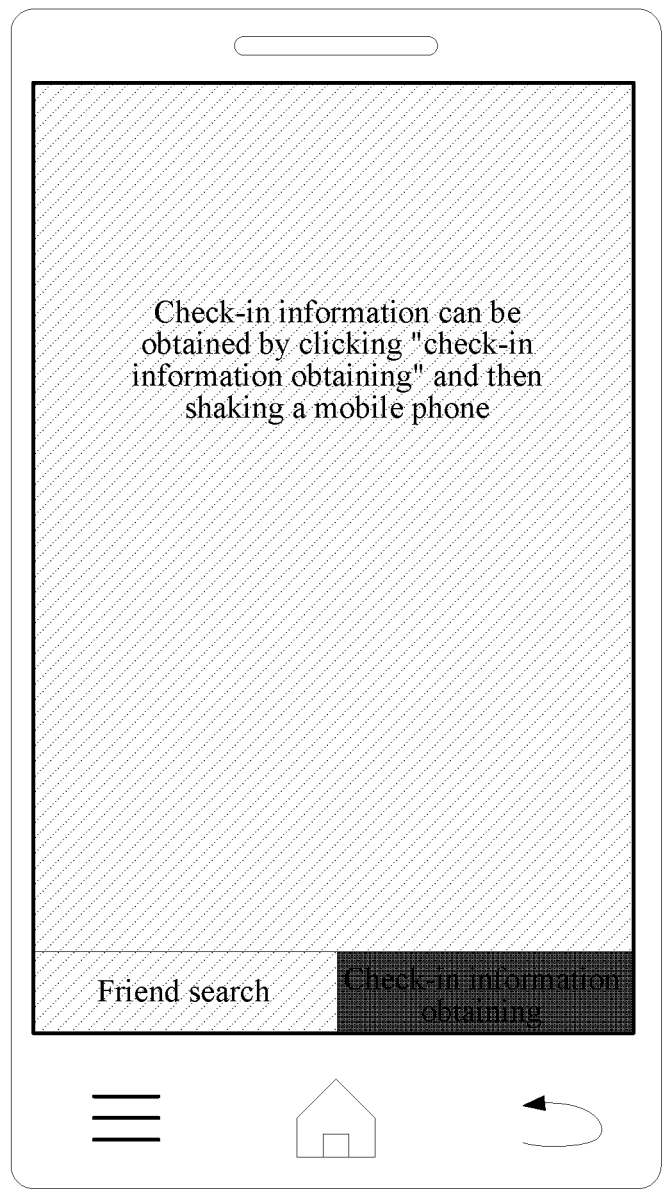
FIG. 5 illustrates a schematic diagram of an interface of a terminal for obtaining a check-in instruction manner according to some embodiments of the present invention.

There may be many specific manners of enabling the check-in function. For example, if a terminal provides multiple function options, one of which is a check-in function option, when the terminal learns that the check-in function option is selected, it is determined that a check-in function is enabled. As shown in FIG. 5, FIG. 5 is a schematic diagram of a terminal interface for obtaining a check-in instruction manner. In the terminal interface shown in FIG. 5, the terminal provides two function options, which are separately a friend making function option "friend search" and a check-in function option "check-in information obtaining". If the terminal learns that the "check-in information obtaining" is selected, it is determined that a check-in function is enabled. After the check-in function is enabled, if the terminal detects by using a location sensor included in the terminal itself that the gravity center location of the terminal changes, it is determined that the terminal detects a shaking action, thereby determining that a check-in instruction is obtained.

402: The terminal collects multimedia data corresponding to a currently played video according to the check-in instruction.

In order to ensure accuracy of check-in data, and ensure that check-in is implemented on the basis that a user corresponding to a terminal watches a video, in the method provided in this embodiment of the present invention, the terminal needs to collect multimedia data corresponding to a currently played video according to a check-in instruction, so that subsequently a server may determine on this basis whether the user corresponding to the terminal is watching the video. A device for playing the current video is not limited in this embodiment of the present invention, and during a specific implementation, the device for playing the current video includes but is not limited to a television. A specific form of multimedia data is not specifically limited in this embodiment of the present invention. During a specific implementation, the multimedia data includes but is not limited to image data or audio data. When the multimedia data is image data, the image data includes but is not limited to a picture or video at the time of playing the video. When the multimedia data is audio data, the audio data includes but is not limited to data such as frequency or amplitude of a regular sound wave carried with a voice, music and a sound effect and sent at the time of playing the video.

A manner in which the terminal collects the multimedia data corresponding to the currently played video according to the check-in instruction is not specifically limited in this embodiment of the present invention. During a specific implementation, the manner includes but is not limited to: collecting multimedia data corresponding to the currently played video once in every preset time according to the check-in instruction; or collecting multimedia data corresponding to a currently played video once according to the check-in instruction.

Optionally, in order that subsequently the server determines whether the user corresponding to the terminal is actually watching the video, it may be limited to be effective when a total time length of the multimedia data collected by the terminal reaches a second preset time. That is, when the total time length of the multimedia data collected by the terminal reaches the second preset time, the server may determine that the user corresponding to the terminal is watching the video; otherwise, the server determines that the user corresponding to the terminal is not watching the video. In this situation, the multimedia data corresponding to the currently played video collected by the terminal according to the check-in instruction needs to reach the second preset time. A specific value of the second preset time is not specifically limited in this embodiment of the present invention. During a specific implementation, the value may be set to 9 min (minutes), 15 min, 30 min, and the like according to needs.

With reference to the foregoing manner in which the terminal collects the multimedia data corresponding to the currently played video according to the check-in instruction, when it is limited that the total time length of the multimedia data corresponding to the video and collected by the terminal needs to reach the second preset time, if the terminal collects multimedia data corresponding to the currently played video once in every preset time according to the check-in instruction, it needs to ensure that the total time length obtained after time during which the terminal collects multimedia data every time is superposed reaches the second preset time. If the terminal collects multimedia data corresponding to the currently played video once, time during which the multimedia data is collected this time needs to reach the second preset time. It should be noted that, if the terminal collects the currently played video for multiple times, time during which multimedia data is collected every time may be the same, or may also be different, which is not specifically limited in this embodiment of the present invention. For example, if the second preset time is 9 min, and the terminal collects the currently played video for three times, the terminal may collect multimedia data with a time length of 3 min every time; may also collect multimedia data with a time length of 3 min for the first time, collect multimedia data with a time length of 4 min for the second time, and collect multimedia data with a time length of 2 min for the third time; and the like.

For convenience of explaining and describing the foregoing manner in which the terminal collects the multimedia data corresponding to the currently played video according to the check-in instruction, two specific examples are illustrated below.

Example 1: in the example, the terminal collects the multimedia data corresponding to the currently played video once in every preset time according to the check-in instruction, the preset time is 5 min, the second preset time is 15 min, and the time during which the terminal collects the multimedia data corresponding to the video every time is the same, for example, in the example, the time during which the terminal collects the multimedia data every time may be 3 min.

In this case, if a moment at which the terminal begins to collect the currently played video is 10:30:30, the multimedia data collected by the terminal from 10:30:30 to 10:33:30 and played by the video playback device from 10:30:30 to 10:33:30 is used as multimedia data collected for this time, and recorded as multimedia data 1. The multimedia data collected by the terminal from 10:38:30 to 10:41:30 and played by the video playback device from 10:38:30 to 10:41:30 is used as multimedia data collected for this time, and recorded as multimedia data 2. The multimedia data collected by the terminal from 10:46:30 to 10:49:30 and played by the video playback device from 10:46:30 to 10:49:30 is used as multimedia data collected for this time, and recorded as multimedia data 3. The multimedia data collected by the terminal from 10:54:30 to 10:57:30 and played by the video playback device from 10:54:30 to 10:57:30 is used as multimedia data collected for this time, and recorded as multimedia data 4. The multimedia data collected by the terminal from 11:02:30 to 11:05:30 and played by the video playback device from 11:02:30 to 11:05:30 is used as multimedia data collected for this time, and recorded as multimedia data 5. A total time length of collecting multimedia data 1 to multimedia data 5 already reaches 15 min, and therefore, the step in which the terminal collects the multimedia data corresponding to the currently played video according to the check-in instruction ends.

Example 2: a terminal collects a currently played video once according to a check-in instruction. In the example, an example in which the second preset time is 15 min is still taken. If a moment at which the terminal begins to collect the currently played video according to the check-in instruction is 10:30:30, the multimedia data collected by the terminal from 10:30:30 to 10:45:30 and played by the video playback device from 10:30:30 to 10:45:30 is used as collected multimedia data.

403: The terminal determines time information corresponding to the multimedia data.

The manner in which the terminal determines the time information corresponding to the multimedia data is not specifically limited in this embodiment of the present invention. During a specific implementation, if the terminal collects the multimedia data corresponding to the video for multiple times, the terminal may record, in a process of collecting the multimedia data, a moment at which the terminal begins to collect the multimedia data every time, and a moment at which the terminal ends collecting the multimedia data every time, and use a time interval between the moment at which the terminal begins to collect the multimedia data every time and the moment at which the terminal ends collecting the multimedia data every time as the time information corresponding to the multimedia data. If the terminal only collects multimedia data once, a beginning moment and an end moment of collecting the multimedia data for this time are recorded, and a time interval between the beginning moment and the end moment is used as the time information corresponding to the multimedia data.

Specifically, for Example 1 in step 402, the time information corresponding to the multimedia data determined according to the foregoing manner is 10:30:30 to 10:33:30, 10:38:30 to 10:41:30, 10:46:30 to 10:49:30, 10:54:30 to 10:57:30 and 11:02:30 to 11:05:30. For Example 2 in step 402, the time information corresponding to the multimedia data determined according to the foregoing manner is 10:30:30 to 10:45:30.

404: The terminal sends the multimedia data and the time information corresponding to the multimedia data to a server.

The manner in which the terminal sends the multimedia data and the time information corresponding to the multimedia data to the server is not specifically limited in this embodiment of the present invention. During a specific implementation, the manner may be determined with reference to the manner in which the terminal collects the currently played video. Specifically, if the terminal collects the multimedia data corresponding to the video for multiple times, after the multimedia data corresponding to the video is collected completely every time, the collected multimedia data and time information corresponding to the multimedia data collected for this time may be immediately sent. Certainly, in this situation, the terminal may also send multimedia data collected every time and time information corresponding to the multimedia data collected every time for one time after collecting all multimedia data completely. If the terminal only collects multimedia data once, the terminal sends the collected multimedia data and time information corresponding to the multimedia data after collecting the multimedia data completely.

405: The server receives the multimedia data and the time information corresponding to the multimedia data sent by the terminal.

The manner in which the server receives the multimedia data and the time information corresponding to the multimedia data sent by the terminal is not limited in this embodiment of the present invention. During a specific implementation, the manner may be determined with reference to the manner in which the terminal sends the multimedia data and the time information corresponding to the multimedia data.

Specifically, if the terminal collects multimedia data for multiple times, and directly sends, after collecting multimedia data completely every time, the multimedia data collected for this time and time information corresponding to the multimedia data collected for this time, the server receives, for multiple times, the multimedia data and the time information corresponding to the multimedia data sent by the terminal; if the terminal collects multimedia data for multiple times, and sends, after collecting all multimedia data completely, the multimedia data collected each time and time information corresponding to the multimedia data collected each time for one time, the server receives, for one time, the multimedia data collected each time and the time information corresponding to the multimedia data collected each time sent by the terminal for one time. If the terminal only collects multimedia data once, the terminal only sends collected multimedia data once and time information corresponding to the multimedia data, and therefore, the server only receives the multimedia data sent by the terminal once and the time information corresponding to the multimedia data.

406: The server determines whether a user corresponding to the terminal is watching the video according to the multimedia data and the time information corresponding to the multimedia data.

In order to ensure that check-in data obtained by video-based check-in has better authenticity and reliability, the video-based check-in method provided in this embodiment of the present invention needs to ensure that the user performs check-in on the basis of watching the video. Therefore, the server needs to determine whether a user corresponding to the terminal is watching the video according to the multimedia data and the time information corresponding to the multimedia data. There may be many manners in which the server determines whether a user corresponding to the terminal is watching the video according to the multimedia data and the time information corresponding to the multimedia data, and during a specific implementation, the manners include but are not limited to: determining whether the collected multimedia data is consistent with multimedia data corresponding to the video in the time information corresponding to the multimedia data; and determining, if the collected multimedia data is consistent with the multimedia data corresponding to the video in the time information corresponding to the multimedia data, that a user corresponding to the terminal is watching the video.

Before the determining whether the collected multimedia data is consistent with multimedia data corresponding to the video in the time information corresponding to the multimedia data, multimedia data of the video in the time information corresponding to the collected multimedia data further needs to be obtained. The manner in which multimedia data of the video in the time information corresponding to the collected multimedia data is obtained is not specifically limited in this embodiment of the present invention. During a specific implementation, multimedia data and corresponding time information of each satellite transmitted by a television transmission satellite may be received by using a digital satellite receiver in real time, and the multimedia data and the corresponding time information of each satellite may be stored. Multimedia data corresponding to a video is multimedia data of a satellite, and multimedia data of a video in time information corresponding to collected multimedia data is multimedia data of multimedia data corresponding to a satellite in time information corresponding to collected multimedia data. Therefore, when whether the collected multimedia data is consistent with multimedia data corresponding to the video in the time information corresponding to the multimedia data is determined, the determining may be implemented by comparing the collected multimedia data with the multimedia data of the video in the time information corresponding to the collected multimedia data. For example, if the collected multimedia data is image data, and the image data is a picture, the determining may be implemented by comparing the collected picture with the picture data of the video at the time of collecting the picture. If the collected multimedia data is audio data, and the audio data is a frequency of a voice, the determining may be implemented by comparing the frequency of the collected voice with the frequency of the voice of the video in time information corresponding to the collected audio data.

Optionally, if the multimedia data is audio data, when it is determined that the user corresponding to the terminal is watching the video, an audio fingerprint may be further generated according to the audio data and time information corresponding to the audio data, and it is determined whether the audio fingerprint matches a audio fingerprint corresponding to the video; it is determined, if the audio fingerprint matches the audio fingerprint corresponding to the video, that the user corresponding to the terminal is watching the video. The manner in which the audio fingerprint is generated according to the audio data and the time information corresponding to the audio data is not specifically limited in this embodiment of the present invention. During a specific implementation, the audio data and the time information corresponding to the audio data may be converted into a symbol sequence formed by specific symbols, and the symbol sequence is used as an audio fingerprint.

If the terminal collects audio data for multiple times, the server may generate, during audio fingerprint generation, an audio fingerprint from audio data collected by the terminal every time and time information corresponding to the audio data collected every time, thereby obtaining multiple audio fingerprints. If the terminal only collects audio data once, the server generates an audio fingerprint from audio data collected for this time and time information corresponding to the audio data.

The manner of determining whether the audio fingerprint matches an audio fingerprint corresponding to the video includes but is not limited to: if multiple audio fingerprints are obtained during audio fingerprint generation, the manner is implemented by matching each generated audio fingerprint with the audio fingerprint corresponding to the video; if only one audio fingerprint is generated, the manner is implemented by matching the audio fingerprint with the audio fingerprint corresponding to the video.

It should be noted that, only that the server generates an audio fingerprint from the audio data collected by the terminal and the time information corresponding to the audio data is described herein. However, during a specific implementation, after the terminal collects multimedia data and determines time information corresponding to the multimedia data, an audio fingerprint may be directly generated, thereby directly submitting the generated audio fingerprint to the server. In this case, the server determines, by receiving an audio fingerprint and determining whether the received audio fingerprint matches an audio fingerprint corresponding to a video, whether the user corresponding to the terminal is watching the video.

407: Send, if the server determines that the user corresponding to the terminal is watching the video, a check-in manner corresponding to the video to the terminal.

There may be many specific forms of the check-in manner. For example, the check-in manner may be a check-in webpage including a check-in option corresponding to the video, may further be a check code for performing check-in, and the like.

The specific implementation manner in which the check-in manner corresponding to the video is sent to the terminal is not limited in this embodiment of the present invention. During a specific implementation, there may be different methods with reference to the specific forms of the check-in manner. For example, if the check-in manner is a check-in webpage including a check-in option corresponding to the video, the server sends the check-in manner corresponding to the video to the terminal by sending the check-in webpage including the check-in option corresponding to the video to the terminal; if the check-in manner is a check code for performing check-in, the server sends the check-in manner corresponding to the video to the terminal by sending the check code for performing check-in to the terminal; and the like.

408: The terminal receives and displays the check-in manner, and completes check-in on the video according to the check-in manner.

The specific implementation manner in which the terminal receives the check-in manner and displays the check-in manner is not specifically limited in this embodiment of the present invention. There may be different manners in which check-in on the video is completed according to the check-in manner with reference to a specific form of the check-in manner delivered by the server. For example, if the check-in manner is a webpage including a check-in option corresponding to the video, the terminal may complete check-in by opening the webpage and by selecting the check-in option in the webpage; if the check-in manner is a check code for performing check-in, the terminal may send the check code to the server to complete check-in.

Optionally, in a process in which the terminal participates in video-based check-in, in order that the server determines which user performs check-in on the video, and in order to help the server collect statistics on statistical data related to performing check-in on the video, the method may further include the following steps:

Step a: The terminal obtains user information corresponding to the user, and submits the user information to the server.

Neither the manner in which the terminal obtains user information corresponding to the user nor the manner in which the terminal submits the user information to the server is specifically limited in this embodiment of the present invention. When the terminal obtains the user information corresponding to the user, the obtaining includes but is not limited to implementing the obtaining by obtaining login information. Additionally, specific content about the user information includes but is not limited to account number information, avatar information, nickname information, level information, and the like of the user.

Step b: The server receives the user information submitted by the terminal, and updates statistical data related to the video according to the user information.

The manner in which the server receives the user information submitted by the terminal is not limited in this embodiment of the present invention. Additionally, specific content of the statistical data related to the video is not limited in this embodiment of the present invention likewise. During a specific implementation, the statistical data related to the video includes but is not limited to a total quantity of users performing check-in on the video, and specific user information of a user performing check-in on the video. Therefore, the manner in which the server updates the statistical data related to the video according to the user information includes but is not limited to: increasing the total quantity of the users performing check-in on the video by one, and adding user information to a check-in database formed by user information of all users who have already performed check-in on the video.

It should be noted that, that the terminal obtains user information corresponding to the user, and submits the user information to the server in step a may occur at any moment when the terminal participates in a process of performing check-in on the video. For example, step a may be before step 401, may also be after step 408, and may further be before or after any step of step 401 to step 408, which is not specifically limited in this embodiment of the present invention. However, when the server updates the statistical data related to the video according to the user information in step b, if the statistical data related to the video is data related to a check-in result of the user corresponding to the terminal, that the server updates the statistical data related to the video according to the user information occurs after step 408.

Optionally, in order that the user corresponding to the terminal clarifies which users in the friend relationship chain have already watched the video, and which friends have performed check-in on the video, after that the server receives the user information submitted by the terminal in step b, the method may further include the following steps:

Step c: The server obtains a friend relationship chain of the user corresponding to the terminal according to the user information, determines friend information corresponding to a friend in the friend relationship chain who has performs check-in on the video, and sends the friend information to the terminal.

The manner in which the server obtains a friend relationship chain of the user corresponding to the terminal according to the user information is not specifically limited in this embodiment of the present invention. During a specific implementation, the server may store a mapping relationship between a user account number and all friends corresponding to the user account number in advance. Therefore, when obtaining the friend relationship chain of the user corresponding to the terminal according to the user information, the server may first obtain a user account number of the user corresponding to the terminal, and thereby query the mapping relationship stored in advance for the friend relationship chain corresponding to the user account number according to the user account number. The manner of querying the mapping relationship stored in advance for the friend relationship chain corresponding to the user account number according to the user account number includes but is not limited to: comparing the obtained user account number with a user account number in the mapping relationship stored in advance.

Additionally, specific content about the friend information is not specifically limited in this embodiment of the present invention likewise. During a specific implementation, in order that the user corresponding to the terminal clarifies which users in the friend relationship chain perform check-in on the video, the friend information includes but is not limited to: check-in information corresponding to a friend, in the friend relationship chain of the user corresponding to the terminal, who has performed check-in on the video. The check-in information includes but is not limited to nickname information, avatar information, account number information, and the like of a friend.

The manner of determining friend information corresponding to a friend in the friend relationship chain who has performed check-in on the video includes but is not limited to: after a user corresponding to each terminal completes check-in by using the corresponding terminal, the user obtains friend information corresponding to the user, thereby forming a check-in database. Therefore, when friend information corresponding to a friend in the friend relationship chain who has performed check-in on the video is determined, a friend in the friend relationship chain who has performed check-in on the video may be first obtained, and check-in information of each friend is obtained from the check-in database. Additionally, the manner in which the server sends friend information to the terminal is not specifically limited in this embodiment of the present invention. During a specific implementation, in order to help the user corresponding to the terminal identify which friends in the friend relationship chain perform check-in on the video, the friend information sent by the server to the terminal may only include nickname information of a friend who has performed check-in on the video.

Step d: The terminal receives the friend information returned by the server according to the user information, and displays the friend information.

The manner in which the terminal receives the friend information returned by the server according to the user information, and displays the friend information is not specifically limited in this embodiment of the present invention. By receiving the friend information returned by the server according to the user information and displaying the friend information, the user corresponding to the terminal may be made to determine a friend in the friend relationship chain who has performed check-in on the video, so that the user may further determine whether to watch the video and determine whether to perform check-in on the video.

Further, generally after a user has watched a video, the user often publishes a comment on the video, and therefore, in order that a user corresponding to a terminal obtains what comment on the video is published by the user who has watched the video, the method provided in this embodiment of the present invention may further include the following steps:

Step e: The server returns comment information of the video to the terminal, the comment information being comment information published by a user who has performed check-in on the video.

A user who has performed check-in on the video may be a user in a friend relationship chain of the user corresponding to the terminal, and may also be a user in a non-friend relationship chain who has performed check-in on the video, which is not specifically limited in this embodiment of the present invention. Additionally, specific content about the comment information is not specifically limited in this embodiment of the present invention likewise, for example, the comment information includes but is not limited to content such as a positive comment, a negative comment or video watching focus information.

Additionally, before returning the comment information of the video to the terminal, the server further needs to obtain the comment information of the video. The manner in which the server obtain the comment information of the video includes but is not limited to: obtaining an identifier of the video, and querying a database formed in advance by a video identifier and comment information for comment information corresponding to the identifier of the video, thereby using the found comment information corresponding to the identifier of the video as the obtained comment information of the video.

Step f: The terminal receives the comment information of the video returned by the server, and displays the comment information.

The manner in which the terminal receives the comment information of the video returned by the server, and displays the comment information is not specifically limited in this embodiment of the present invention.

Optionally, after completing check-in on the video according to the check-in manner, the terminal may also publish a comment on the video. Therefore, the method provided in this embodiment of the present invention may further include the following steps:

Step g: The terminal obtains the comment information published by the user on the video, and submits the comment information to the server.

The manner in which the terminal obtains the comment information published by the user on the video includes but is not limited to: if the check-in manner is a webpage including a check-in option, a comment area may be provided in the webpage. In this case, the terminal may obtain the comment information input by the user in the comment area to obtain the comment information published by the user on the video. The manner of submitting the comment information to the server is not specifically limited in this embodiment of the present invention.

Moreover, besides that the terminal may obtain the comment information of the user on the video, the terminal may further reply, after receiving the comment information of the video returned by the server, to comment information published by a user. A manner of replying to comment information of a user is not specifically limited in this embodiment of the present invention.

Step h: The server receives the comment information on the video obtained by the terminal after performing check-in on the video, and delivers the comment information to a terminal corresponding to a friend, in the friend relationship chain of the user corresponding to the terminal, who has performed check-in on the video.

The manner in which the server receives the comment information on the video obtained by the terminal after performing check-in on the video, and delivers the comment information to a terminal corresponding to a friend, in the friend relationship chain of the user corresponding to the terminal, who has performed check-in on the video is not limited in this embodiment of the present invention.

In this embodiment of the present invention, the terminal obtains comment information of the corresponding user on the video, and submits the comment information to the server, and the server delivers the comment information to a terminal corresponding to a friend, in a friend relationship chain of the user corresponding to the terminal, who has performed check-in on the video, which may help carry out video-based interaction in the friend relationship chain.

The manner in which the server receives the comment information on the video obtained by the terminal after performing check-in on the video is not limited in this embodiment of the present invention. Additionally, in order that a friend in the friend relationship chain has already performed check-in on the video learns evaluation of the user corresponding to the terminal on the video, the server may deliver the comment information to a terminal corresponding to a friend, in the friend relationship chain of the user corresponding to the terminal, who has already performed check-in on the video, thereby helping carry out video-based communication and interaction in the friend relationship chain.

In the method provided in this embodiment of the present invention, a terminal collects multimedia data corresponding to a currently played video, determines time information corresponding to the multimedia data, and submits the multimedia data and the time information corresponding to the multimedia data to a server, the server sends a check-in manner to the terminal after the server determines according to the multimedia data and the time information corresponding to the multimedia data that a user is watching the video, and the terminal completes check-in according to the check-in manner, thereby ensuring that check-in is implemented on the basis that the user watches the video, so that check-in data obtained by using check-in has better authenticity, and thereby a response of the user to the video obtained according to the check-in data has better reliability.

Figure 6:
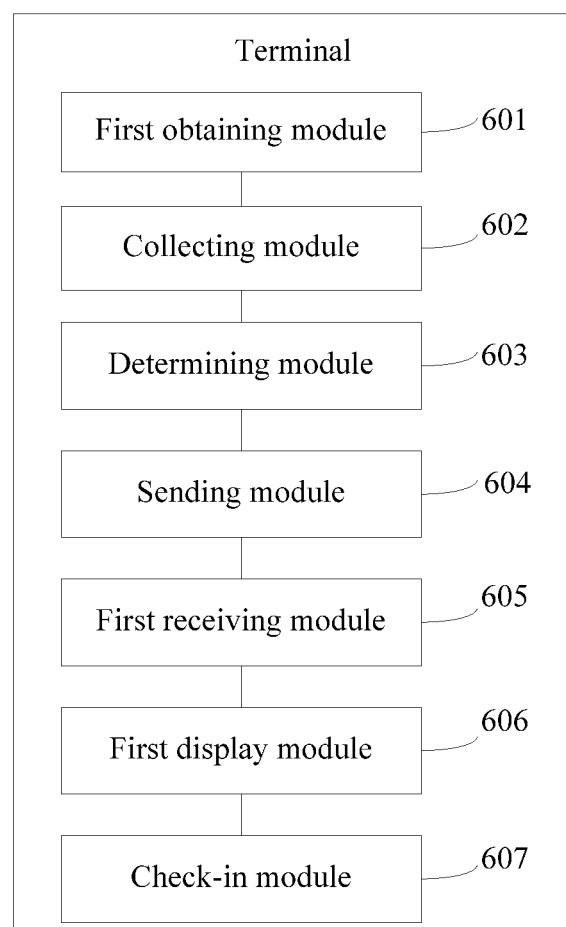
FIG. 6 illustrates a schematic structural diagram of a terminal according to some embodiments of the present invention.

FIG. 6 is a schematic structural diagram of a video-based check-in terminal according to an exemplary embodiment. The terminal is configured to perform the functions performed by the terminal in any one of the embodiments corresponding to FIG. 2 to FIG. 4. Referring to FIG. 6, the terminal includes:

a first obtaining module 601, configured to obtain a check-in instruction;

a collecting module 602, configured to collect multimedia data corresponding to a currently played video according to the check-in instruction;

a determining module 603, configured to determine time information corresponding to the multimedia data;

a sending module 604, configured to send the multimedia data and the time information corresponding to the multimedia data to a server;

a first receiving module 605, configured to receive a check-in manner corresponding to the video sent after the server determines according to the multimedia data and the time information corresponding to the multimedia data that a user is watching the video;

a first display module 606, configured to display the check-in manner; and a check-in module 607, configured to complete check-in on the video according to the check-in manner.

Figure 7:
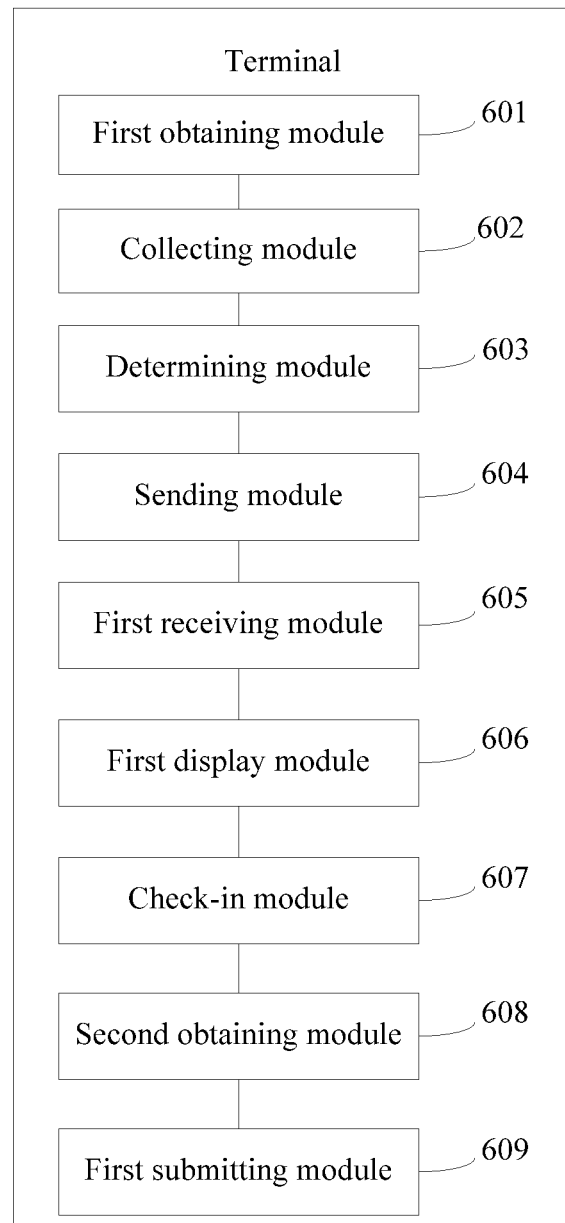
FIG. 7 illustrates a schematic structural diagram of a terminal according to some embodiments of the present invention.

Optionally, referring to FIG. 7, the terminal further includes:

a second obtaining module 608, configured to obtain user information corresponding to the user; and a first submitting module 609, configured to submit the user information to the server, so that the server updates statistical data related to the video according to the user information.

Figure 8:
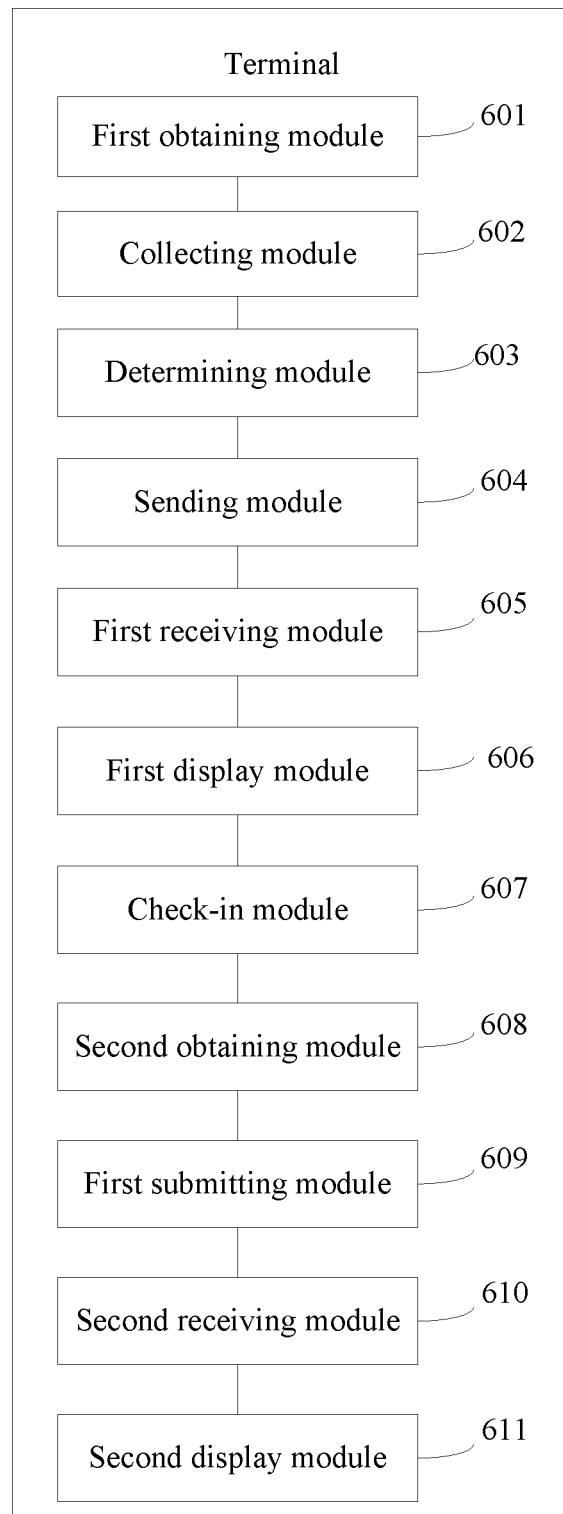
FIG. 8 illustrates a schematic structural diagram of a terminal according to some embodiments of the present invention.

Optionally, referring to FIG. 8, the terminal further includes:

a second receiving module 610, configured to receive friend information returned by the server according to the user information, the friend information including check-in information corresponding to a friend, in a friend relationship chain of the user, who has performed check-in on the video; and a second display module 611, configured to display the friend information.

Figure 9:
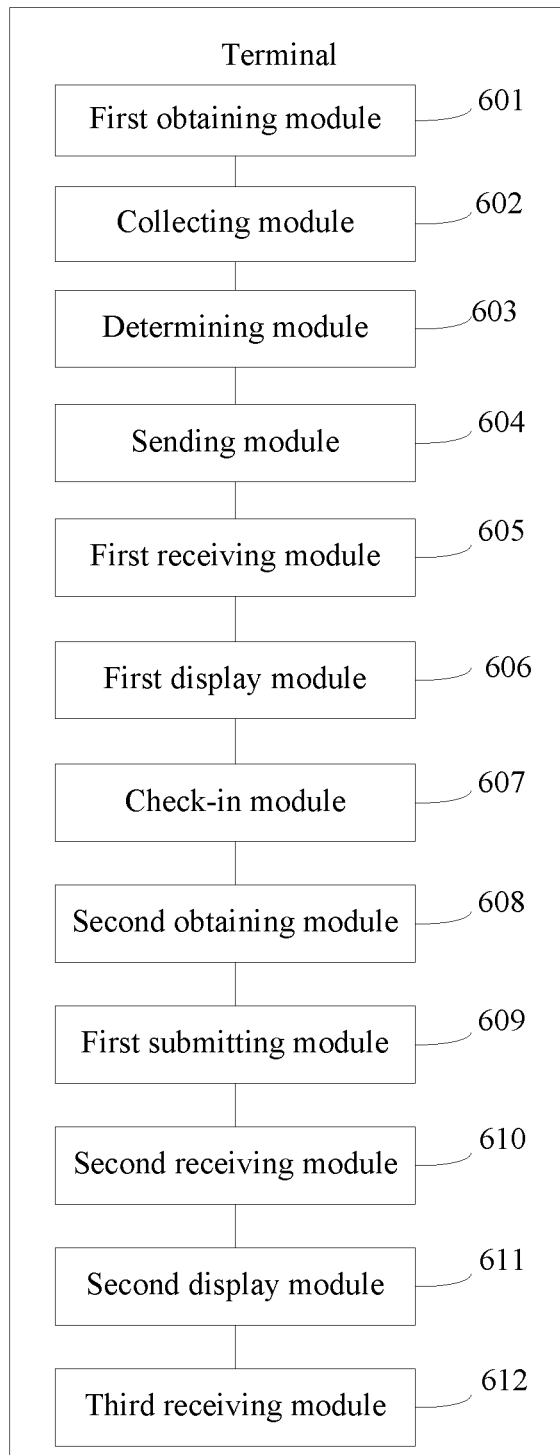
FIG. 9 illustrates a schematic structural diagram of a terminal according to some embodiments of the present invention.

Optionally, referring to FIG. 9, the terminal further includes:

a third receiving module 612, configured to receive comment information of the video returned by the server, the comment information being comment information published by a user who has performed check-in on the video.

Figure 10:
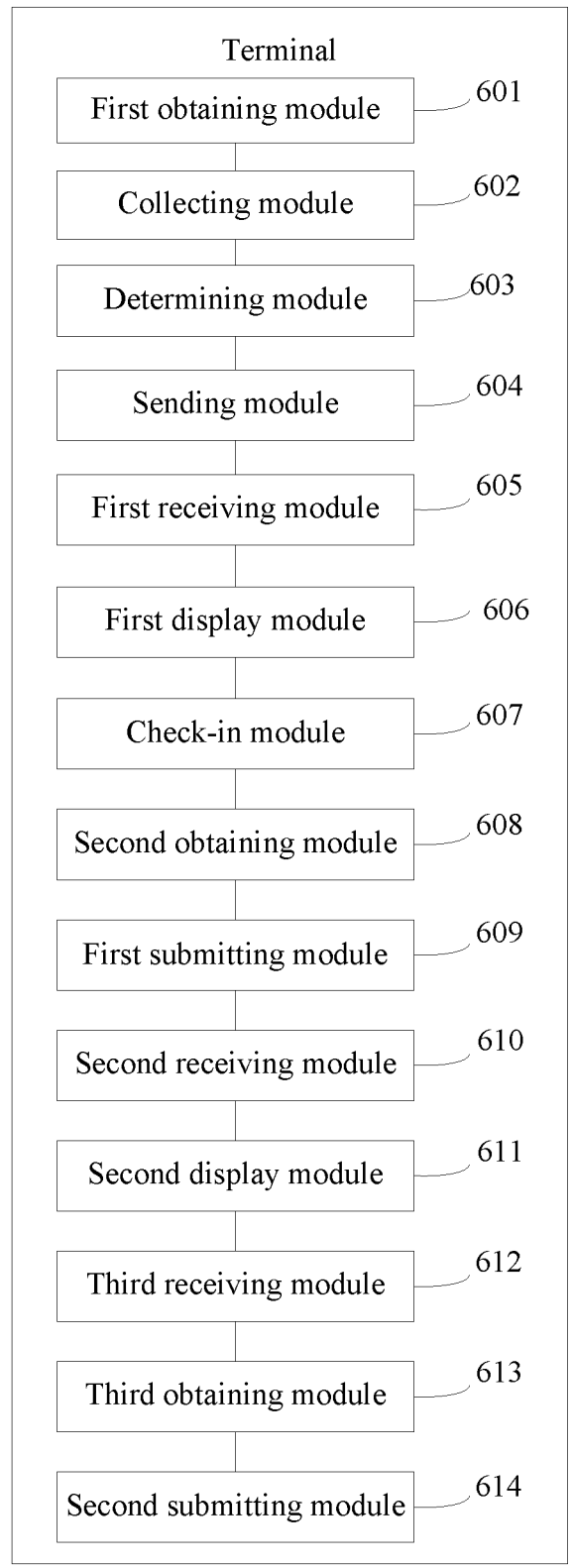
FIG. 10 illustrates a schematic structural diagram of a terminal according to some embodiments of the present invention.

Optionally, referring to FIG. 10, the terminal further includes:

a third obtaining module 613, configured to obtain comment information published by the user on the video; and a second submitting module 614, configured to submit the comment information to the server, so that the server delivers the comment information to a terminal corresponding to a friend, in a friend relationship chain of the user, who has performed check-in on the video.

Optionally, the collecting module 602 is configured to collect multimedia data corresponding to the currently played video once in every preset time according to the check-in instruction; and the determining module 603 is configured to determine time information corresponding to the multimedia data collected every time.

The terminal provided in this embodiment of the present invention collects multimedia data corresponding to a currently played video, determines time information corresponding to the multimedia data, and submits the multimedia data and the time information corresponding to the multimedia data to a server, so that the server sends a check-in manner after the server determines according to the multimedia data and the time information corresponding to the multimedia data that a user is watching the video is received, thereby completing check-in according to the check-in manner, and ensuring that check-in is implemented on the basis that the user watches the video, so that check-in data obtained by using check-in has better authenticity, and thereby a response of the user to the video obtained according to the check-in data has better reliability.

Figure 11:
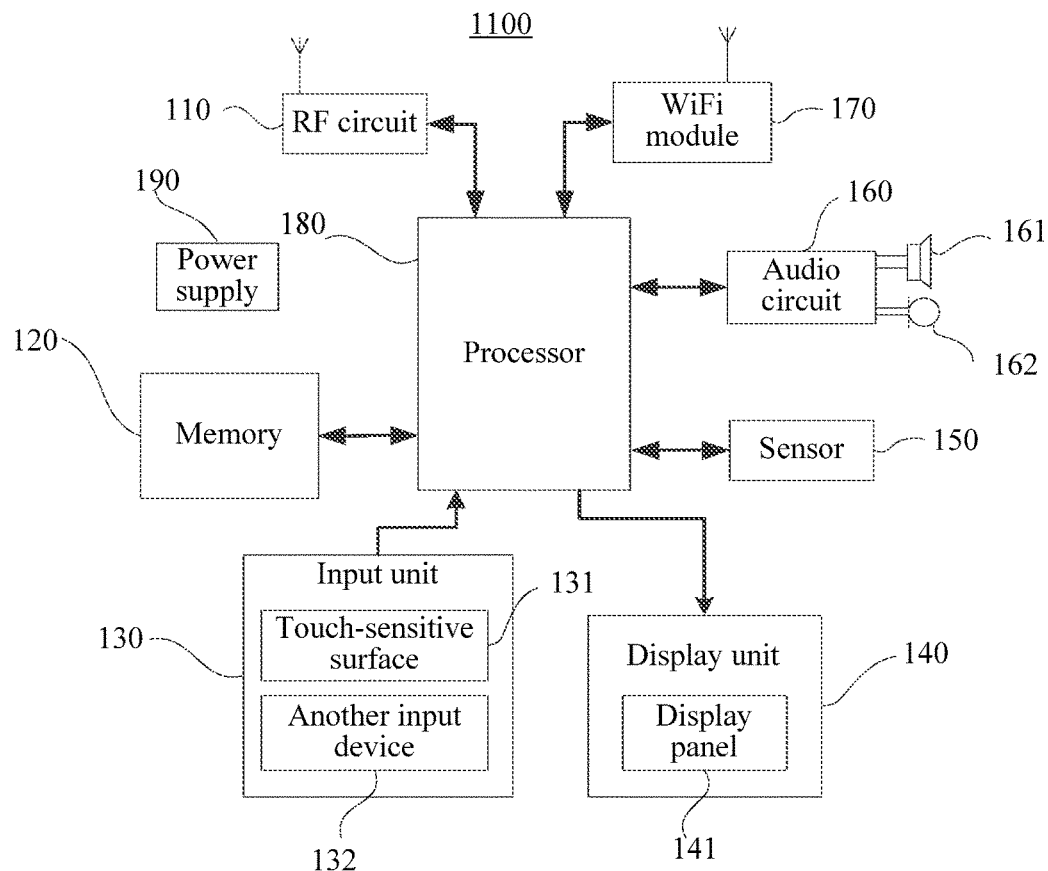
FIG. 11 illustrates a schematic structural diagram of a terminal according to some embodiments of the present invention.

Referring to FIG. 11, FIG. 11 is a schematic structural diagram of a terminal involved in some embodiments of the present invention. The terminal may be configured to implement the video-based check-in method provided in any one of the embodiments corresponding to FIG. 2 to FIG. 4. Specifically:

The terminal 1100 may include components such as a radio frequency (RF) circuit 110, a memory 120 including one or more computer readable storage media, an input unit 130, a display unit 140, a sensor 150, an audio circuit 160, a Wireless Fidelity (WiFi) module 170, a processor 180 including one or more processing cores, and a power supply 190. A person skilled in the art may understand that the structure of the terminal shown in FIG. 11 does not constitute a limitation to the terminal, and the terminal may include more components or fewer components than those shown in the figure, or some components may be combined, or a different component deployment may be used.

The RF circuit 110 may be configured to receive and send a signal during an information receiving and sending process or a call process. Specifically, the RF circuit receives downlink information from a base station, then delivers the downlink information to one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 120 may be configured to store a software program and module. The processor 180 runs the software program and module stored in the memory 120, to implement various functional applications and data processing. The memory 120 may include a program storage area and a data storage area. The program storage area may store an operating system, an application program required by at least one function (such as a sound playback function and an image display function), and the like. The data storage area may store data (such as audio data and an address book) created according to use of the terminal 1100, and the like. In addition, the memory 120 may include a high speed random access memory, and may also include a non-volatile memory, such as at least one magnetic disk storage device, a flash memory, or another volatile solid storage device. Accordingly, the memory 120 may further include a memory controller, so that the processor 180 and the input unit 130 access the memory 120.

The input unit 130 may be configured to receive input digit or character information, and generate keyboard, mouse, joystick, optical, or track ball signal input related to the user setting and function control. Specifically, the input unit 130 may include a touch-sensitive surface 131 and another input device 132. The touch-sensitive surface 131 may also be referred to as a touch display screen or a touch panel, and may collect a touch operation of a user on or near the touch-sensitive surface (such as an operation of a user on or near the touch-sensitive surface 131 by using any suitable object or attachment, such as a finger or a touch pen), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be implemented by using various types, such as a resistive type, a capacitive type, an infrared type, and a surface acoustic wave type. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, a joystick, and the like.

The display unit 140 may be configured to display information input by the user or information provided for the user, and various graphical user interfaces of the terminal 1100. The graphical user interfaces may be formed by a graph, a text, an icon, a video, and any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine a type of a touch event. Then, the processor 180 provides corresponding visual output on the display panel 141 according to the type of the touch event. Although, in FIG. 11, the touch-sensitive surface 131 and the display panel 141 are used as two separate parts to implement input and output functions, in some embodiments, the touch-sensitive surface 131 and the display panel 141 may be integrated to implement the input and output functions.

The terminal 1100 may further include at least one sensor 150, such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal 1100 is moved to the ear. As one type of motion sensor, a gravity acceleration sensor may detect magnitude of accelerations at various directions (which generally are triaxial), may detect magnitude and a direction of the gravity when static, and may be configured to identify an application of a terminal gesture (such as switchover between horizontal and vertical screens, a related game, and gesture calibration of a magnetometer), a related function of vibration identification (such as a pedometer and a knock). Other sensors, such as a gyroscope, a barometer, a hygrometer, a thermometer, and an infrared sensor, which may be configured in the terminal 1100 are not further described herein.

The audio circuit 160, a loudspeaker 161, and a microphone 162 may provide audio interfaces between the user and the terminal 1100. The audio circuit 160 may transmit, to the loudspeaker 161, an electric signal converted from received audio data. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, so as to provide communication between a peripheral earphone and the terminal 1100.

WiFi belongs to a short distance wireless transmission technology. The terminal 1100 may help, by using the WiFi module 170, a user to receive and send an e-mail, browse a webpage, access stream media, and the like, which provides wireless broadband Internet access for the user. Although FIG. 11 shows the WiFi module 170, it may be understood that, the WiFi module 170 does not belong to a necessary constitution of the terminal 1100, and can be ignored according to demands without changing the scope of the essence of the present disclosure.

The processor 180 is a control center of the terminal 1100, and connects to various parts of the terminal by using various interfaces and lines. By running or executing the software program and/or module stored in the memory 120, and invoking data stored in the memory 120, the processor 880 performs various functions and data processing of the terminal 1100, thereby performing overall monitoring on the terminal. Optionally, the processor 180 may include one or more processing cores. The processor 180 may integrate an application processor and a modem. The application processor is configured to process an operating system, a user interface, an application program, and the like. The modem is configured to process wireless communication. It may be understood that, the foregoing modem may also not be integrated into the processor 180.

The terminal 1100 further includes the power supply 190 (such as a battery) for supplying power to the components. Preferably, the power supply may logically connect to the processor 180 by using a power supply management system, thereby implementing functions, such as charging, discharging, and power consumption management, by using the power supply management system. The power supply 190 may further include any component, such as one or more direct current or alternate current power supplies, a recharging system, a power supply fault detection circuit, a power supply converter or an inverter, and a power supply state indicator.

Although not shown in the figure, the terminal 1100 may further include a camera, a Bluetooth module, and the like, which are not further described herein. Specifically, in this embodiment, the display unit of the terminal is a touch screen display, and the terminal further includes a memory and one or more programs. The one or more programs are stored in the memory and configured to be executed by one or more processors. The one or more programs include an instruction used to execute the following operations:

obtaining a check-in instruction;

collecting multimedia data corresponding to a currently played video according to the check-in instruction;

determining time information corresponding to the multimedia data;

sending the multimedia data and the time information corresponding to the multimedia data to a server;

receiving a check-in manner corresponding to the video sent after the server determines according to the multimedia data and the time information corresponding to the multimedia data that a user is watching the video; and displaying the check-in manner, and completing check-in on the video according to the check-in manner.

It is assumed that the foregoing is a first possible implementation manner, in a second possible implementation manner provided by using the first possible implementation manner as a basis, the memory of the terminal further includes an instruction used to execute the following operation: the method further includes:

obtaining user information corresponding to the user, and submitting the user information to the server, so that the server updates statistical data related to the video according to the user information.

In a third possible implementation manner provided by using the second possible implementation manner as a basis, the memory of the terminal further includes an instruction used to execute the following operations: after the submitting the user information to the server, the method further includes:

receiving friend information returned by the server according to the user information, the friend information including check-in information corresponding to a friend, in a friend relationship chain of the user, who has performed check-in on the video; and displaying the friend information.

In a fourth possible implementation manner provided by using the first possible implementation manner as a basis, the memory of the terminal further includes an instruction used to execute the following operation: after the completing check-in on the video according to the check-in manner, the method further includes:

receiving comment information of the video returned by the server, the comment information being comment information published by a user who has performed check-in on the video.

In a fifth possible implementation manner provided by using the first possible implementation manner as a basis, the memory of the terminal further includes an instruction used to execute the following operations: after the completing check-in on the video according to the check-in manner, the method further includes:

obtaining comment information published by the user on the video; and submitting the comment information to the server, so that the server delivers the comment information to a terminal corresponding to a friend, in a friend relationship chain of the user, who has performed check-in on the video.

In a sixth possible implementation manner provided by using the first possible implementation manner as a basis, the memory of the terminal further includes an instruction used to execute the following operations:

The collecting multimedia data corresponding to a currently played video according to the check-in instruction includes:

collecting multimedia data corresponding to the currently played video once in every preset time according to the check-in instruction; and the determining time information corresponding to the multimedia data includes:

determining time information corresponding to the multimedia data collected every time.

An embodiment of the present invention provides a computer readable storage medium, and the computer readable storage medium may be the computer readable storage medium included in the memory in the foregoing embodiment; and may also a computer readable storage medium existing individually and not installed in the terminal. The computer readable storage medium stores one or more programs, and the one or more programs are used by one or more processors to execute the video-based check-in method, and the method includes:

obtaining a check-in instruction;

collecting multimedia data corresponding to a currently played video according to the check-in instruction;

determining time information corresponding to the multimedia data;

sending the multimedia data and the time information corresponding to the multimedia data to a server;

receiving a check-in manner corresponding to the video sent after the server determines according to the multimedia data and the time information corresponding to the multimedia data that a user is watching the video; and displaying the check-in manner, and completing check-in on the video according to the check-in manner.

It is assumed that the foregoing is a first possible implementation manner, in a second possible implementation manner provided by using the first possible implementation manner as a basis, the memory of the terminal further includes an instruction used to execute the following operation: the method further includes:

obtaining user information corresponding to the user, and submitting the user information to the server, so that the server updates statistical data related to the video according to the user information.

In a third possible implementation manner provided by using the second possible implementation manner as a basis, the memory of the terminal further includes an instruction used to execute the following operations: after the submitting the user information to the server, the method further includes:

receiving friend information returned by the server according to the user information, the friend information including check-in information corresponding to a friend, in a friend relationship chain of the user, who has performed check-in on the video; and displaying the friend information.

In a fourth possible implementation manner provided by using the first possible implementation manner as a basis, the memory of the terminal further includes an instruction used to execute the following operation: after the completing check-in on the video according to the check-in manner, the method further includes:

receiving comment information of the video returned by the server, the comment information being comment information published by a user who has performed check-in on the video.

In a fifth possible implementation manner provided by using the first possible implementation manner as a basis, the memory of the terminal further includes an instruction used to execute the following operations: after the completing check-in on the video according to the check-in manner, the method further includes:

obtaining comment information published by the user on the video; and submitting the comment information to the server, so that the server delivers the comment information to a terminal corresponding to a friend, in a friend relationship chain of the user, who has performed check-in on the video.

In a sixth possible implementation manner provided by using the first possible implementation manner as a basis, the memory of the terminal further includes an instruction used to execute the following operations:

The collecting multimedia data corresponding to a currently played video according to the check-in instruction includes:

collecting multimedia data corresponding to the currently played video once in every preset time according to the check-in instruction; and the determining time information corresponding to the multimedia data includes:

determining time information corresponding to the multimedia data collected every time.

An embodiment of the present invention provides a graphical user interface, the graphical user interface is used on a terminal, and the terminal includes a touch screen display, a memory and one or more processors configured to execute one or more programs; the graphical user interface includes:

obtaining a check-in instruction;

collecting multimedia data corresponding to a currently played video according to the check-in instruction;

determining time information corresponding to the multimedia data;

sending the multimedia data and the time information corresponding to the multimedia data to a server;

receiving a check-in manner corresponding to the video sent after the server determines according to the multimedia data and the time information corresponding to the multimedia data that a user is watching the video; and displaying the check-in manner, and completing check-in on the video according to the check-in manner.

Figure 12:
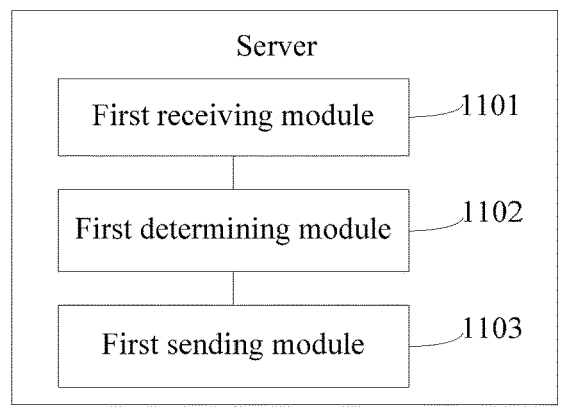
FIG. 12 illustrates a schematic structural diagram of a server according to some embodiments of the present invention.

FIG. 12 is a schematic structural diagram of a video-based check-in server according to another exemplary embodiment. The terminal is configured to perform the functions performed by the server in any one of the embodiments corresponding to FIG. 2 to FIG. 4. Referring to FIG. 12, the server includes:

a first receiving module 1201, configured to receive multimedia data sent by a terminal and time information corresponding to the multimedia data, the multimedia data being multimedia data corresponding to a currently played video and collected by the terminal according to a check-in instruction;

a first determining module 1202, configured to determine whether a user corresponding to the terminal is watching the video according to the multimedia data and the time information corresponding to the multimedia data; and a first sending module 1203, configured to send, when it is determined that the user corresponding to the terminal is watching the video, a check-in manner corresponding to the video to the terminal, so that the terminal completes check-in on the video according to the check-in manner.

Figure 13:
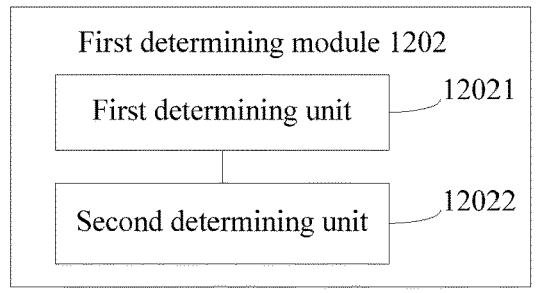
FIG. 13 illustrates a schematic structural diagram of a first determining module according to some embodiments of the present invention.

Optionally, referring to FIG. 13, the first determining module 1202 includes:

a first determining unit 12021, configured to determine whether the multimedia data is consistent with multimedia data corresponding to the video in the time information corresponding to the multimedia data; and a second determining unit 12022, configured to determine, when the multimedia data is consistent with the multimedia data corresponding to the video in the time information corresponding to the multimedia data, that a user corresponding to the terminal is watching the video.

Figure 14:
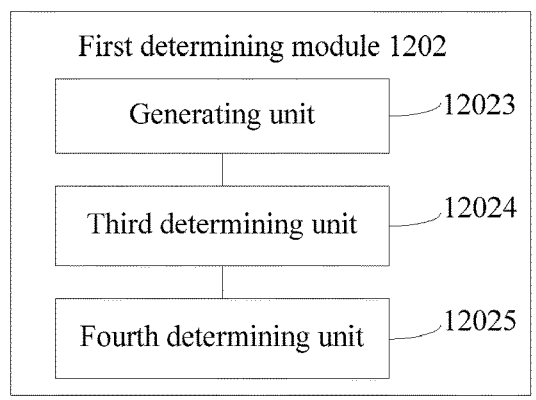
FIG. 14 illustrates a schematic structural diagram of a first determining module according to some embodiments of the present invention.

Optionally, referring to FIG. 14, the first determining module 1202 includes:

a generating unit 12023, configured to generate, when the multimedia data is audio data, an audio fingerprint according to the audio data and time information corresponding to the audio data;

a third determining unit 12024, configured to determine whether the audio fingerprint matches an audio fingerprint corresponding to the video; and a fourth determining unit 12025, configured to determine, when the audio fingerprint matches the audio fingerprint corresponding to the video, that the user corresponding to the terminal is watching the video.

Figure 15:
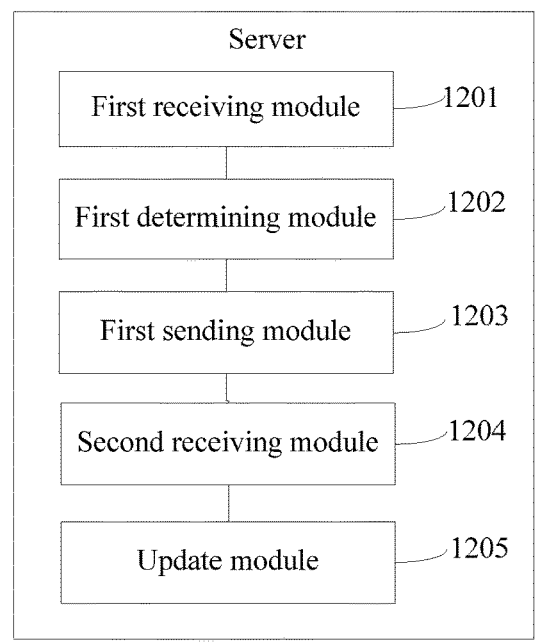
FIG. 15 illustrates a schematic structural diagram of a server according to some embodiments of the present invention.

Optionally, referring to FIG. 15, the server further includes:

a second receiving module 1204, configured to receive user information submitted by the terminal; and an update module 1205, configured to update statistical data related to the video according to the user information.

Figure 16:
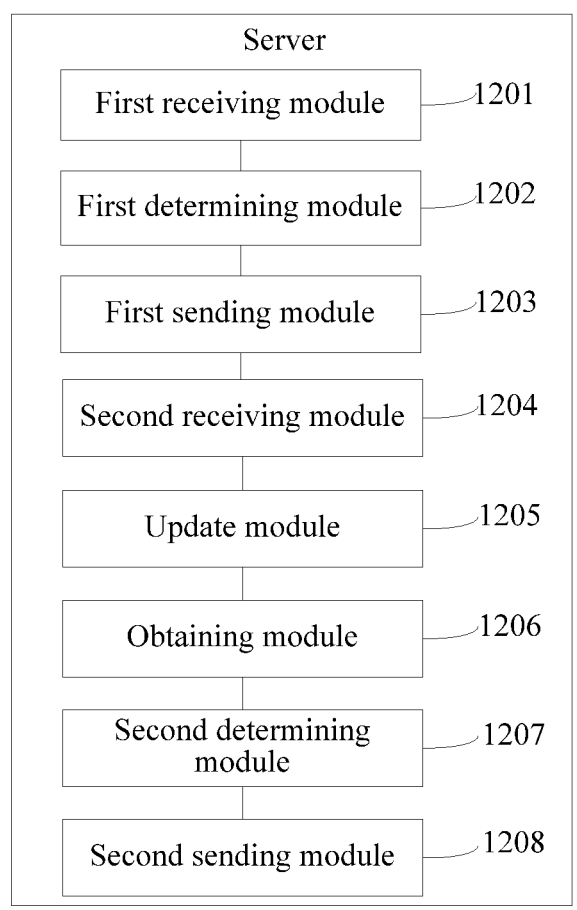
FIG. 16 illustrates a schematic structural diagram of a server according to some embodiments of the present invention.

Optionally, referring to FIG. 16, the server further includes:

an obtaining module 1206, configured to obtain a friend relationship chain of the user corresponding to the terminal according to the user information;

a second determining module 1207, configured to determine friend information corresponding to a friend in the friend relationship chain who has performed check-in on the video; and a second sending module 1208, configured to send the friend information to the terminal, the friend information including check-in information corresponding to the friend, in the friend relationship chain of the user corresponding to the terminal, who has performed check-in on the video.

Figure 17:
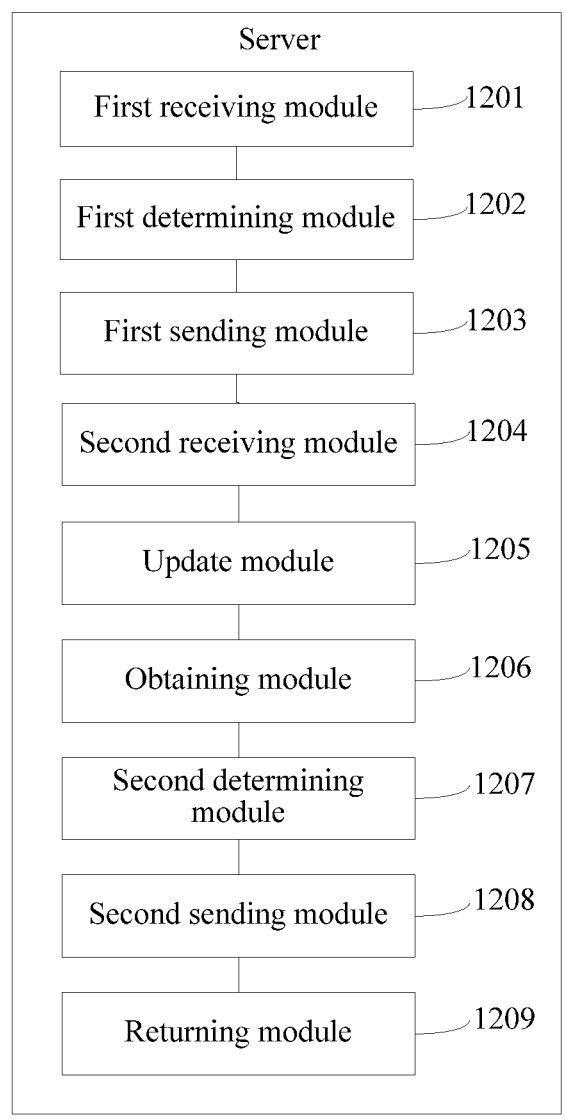
FIG. 17 illustrates a schematic structural diagram of a server according to some embodiments of the present invention.

Optionally, referring to FIG. 17, the server further includes:

a returning module 1209, configured to return comment information of the video to the terminal, the comment information being comment information published by a user who has performed check-in on the video.

Figure 18:
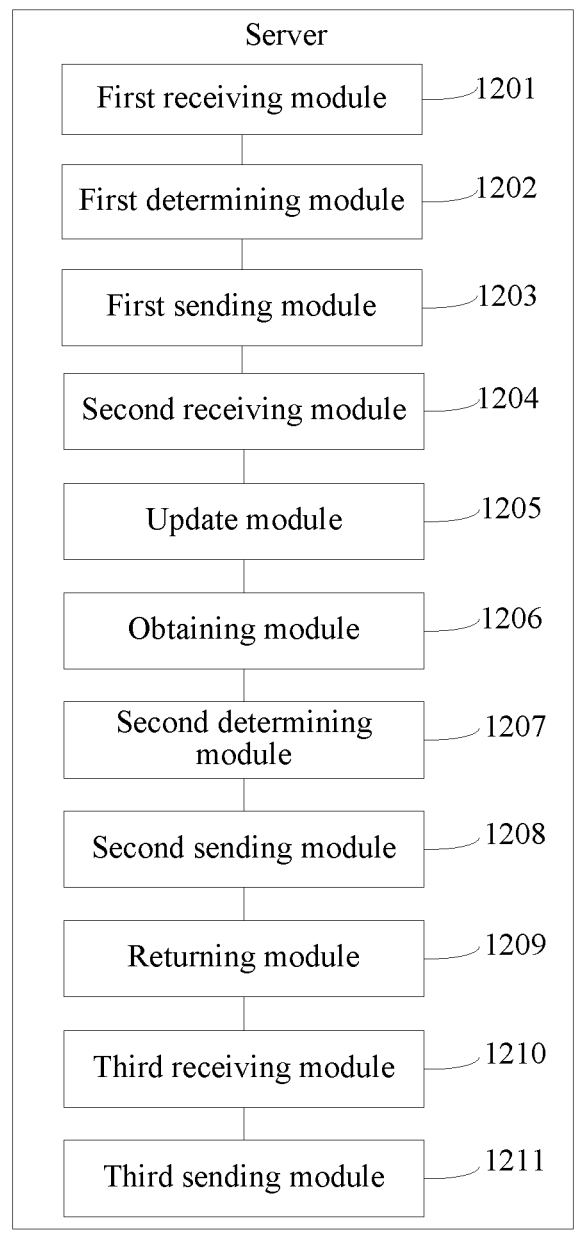
FIG. 18 illustrates a schematic structural diagram of a server according to some embodiments of the present invention.

Optionally, referring to FIG. 18, the server further includes:

a third receiving module 1210, configured to receive comment information on the video obtained by the terminal after check-in is performed on the video; and a third sending module 1211, configured to deliver the comment information to a terminal corresponding to a friend, in a friend relationship chain of the user corresponding to the terminal, who has performed check-in on the video.

Figure 19:
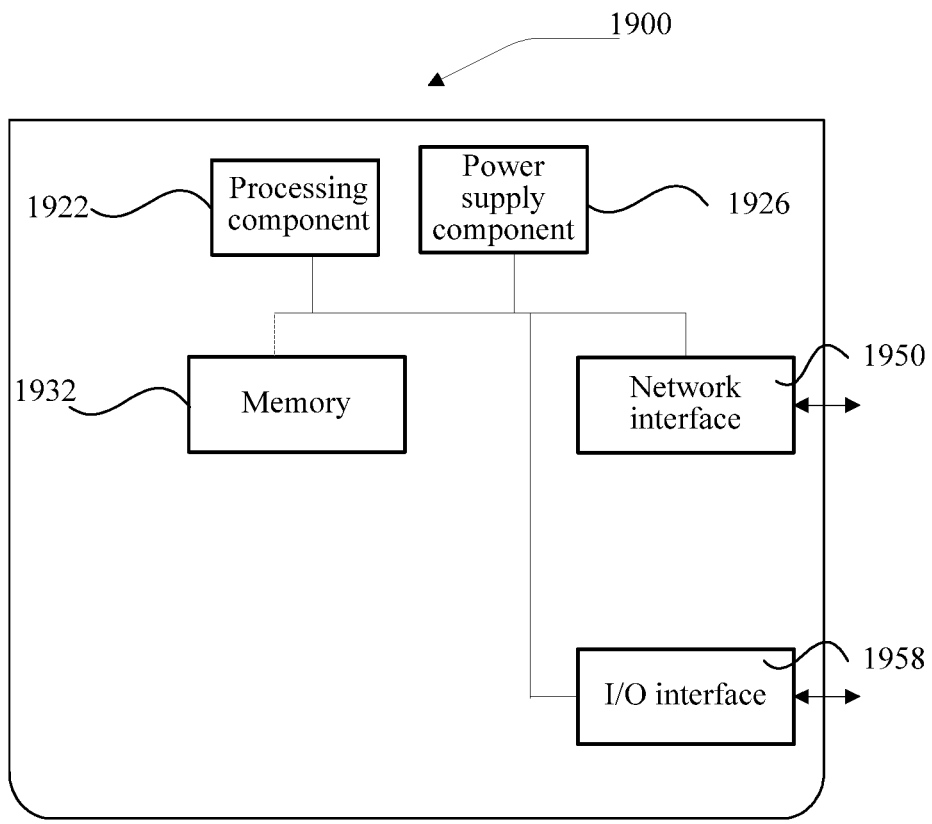
FIG. 19 illustrates a schematic structural diagram of a server according to some embodiments of the present invention.

FIG. 19 is a block diagram of a video-based check-in apparatus 1900 according to an exemplary embodiment. For example, the apparatus 1900 may be provided as a server, and the server may be configured to perform the functions performed by the server in any one of the embodiments corresponding to FIG. 2 to FIG. 4. Referring to FIG. 19, the apparatus 1900 includes a processing component 1922, which further includes one or more processors, and a memory resource represented by a memory 1932, which is configured to store an instruction that can be executed by the processing component 1922, such as an application program. The application program stored in the memory 1932 may include one or more modules each of which is corresponding to a group of instructions. Moreover, the processing component 1922 is configured to execute instructions to perform the foregoing method.

The apparatus 1900 may further include a power supply component 1926 configured to perform power supply management of the apparatus 1900, a wired or wireless network interface 1950 configured to connect the apparatus 1900 to a network, and an input/output (I/O) interface 1958. The apparatus 1900 may operate an operating system stored in the memory 1932, such as Windows Server™, Mac OS X™, Unix™, Linux™, FreeBSD™ or the like.

One or more programs are stored in the memory, and are configured to be executed by one or more processors, and the one or more programs include instructions used to execute the following operations:

receiving multimedia data sent by a terminal and time information corresponding to the multimedia data, the multimedia data being multimedia data corresponding to a currently played video and collected by the terminal according to a check-in instruction;

determining whether a user corresponding to the terminal is watching the video according to the multimedia data and the time information corresponding to the multimedia data; and sending, if it is determined that the user corresponding to the terminal is watching the video, a check-in manner corresponding to the video to the terminal, so that the terminal completes check-in on the video according to the check-in manner.

It is assumed that the foregoing is a first possible implementation manner, in a second possible implementation manner provided by using the first possible implementation manner as a basis, the memory further includes an instruction used to execute the following operation: the determining whether a user corresponding to the terminal is watching the video according to the multimedia data and the time information corresponding to the multimedia data includes:

determining whether the multimedia data is consistent with multimedia data corresponding to the video in the time information corresponding to the multimedia data; and determining, if the multimedia data is consistent with the multimedia data corresponding to the video in the time information corresponding to the multimedia data, that a user corresponding to the terminal is watching the video.

It is assumed that the foregoing is a first possible implementation manner, in a third possible implementation manner provided by using the first possible implementation manner as a basis, the memory further includes an instruction used to execute the following operation: the determining whether a user corresponding to the terminal is watching the video according to the multimedia data and the time information corresponding to the multimedia data includes:

generating, if the multimedia data is audio data, an audio fingerprint according to the audio data and time information corresponding to the audio data, and determining whether the audio fingerprint matches an audio fingerprint corresponding to the video; and determining, if the audio fingerprint matches the audio fingerprint corresponding to the video, that the user corresponding to the terminal is watching the video.

It is assumed that the foregoing is a first possible implementation manner, in a fourth possible implementation manner provided by using the first possible implementation manner as a basis, the memory further includes an instruction used to execute the following operation: the method further includes:

receiving user information submitted by the terminal, and updating statistical data related to the video according to the user information.

It is assumed that the foregoing is a first possible implementation manner, in a fifth possible implementation manner provided by using the first possible implementation manner as a basis, the memory further includes an instruction used to execute the following operation: after the receiving user information submitted by the terminal, the method further includes:

obtaining a friend relationship chain of the user corresponding to the terminal according to the user information;

determining friend information corresponding to a friend in the friend relationship chain who has performed check-in on the video; and sending the friend information to the terminal, the friend information including check-in information corresponding to the friend, in the friend relationship chain of the user corresponding to the terminal, who has performed check-in on the video.

It is assumed that the foregoing is a first possible implementation manner, in a sixth possible implementation manner provided by using the first possible implementation manner as a basis, the memory further includes an instruction used to execute the following operation: after the sending a check-in manner corresponding to the video to the terminal, the method further includes:

returning comment information of the video to the terminal, the comment information being comment information published by a user who has performed check-in on the video.

It is assumed that the foregoing is a first possible implementation manner, in a seventh possible implementation manner provided by using the first possible implementation manner as a basis, the memory further includes an instruction used to execute the following operation: after the sending a check-in manner corresponding to the video to the terminal, the method further includes:

receiving comment information on the video obtained by the terminal after check-in is performed on the video; and delivering the comment information to a terminal corresponding to a friend, in a friend relationship chain of the user corresponding to the terminal, who has performed check-in on the video.

Figure 20:
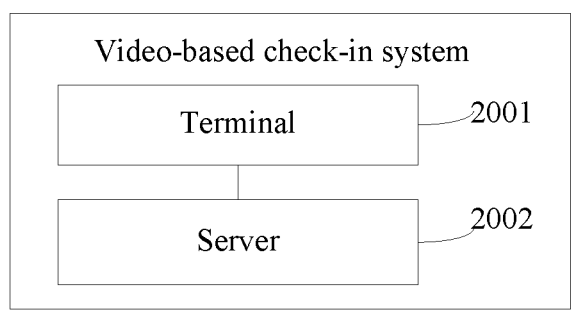
FIG. 20 illustrates a schematic structural diagram of a video-based check-in system according to some embodiments of the present invention.

FIG. 20 shows a video-based check-in system according to another exemplary embodiment. The system configured to perform the video-based check-in method provided in any one of the embodiments shown in FIG. 2 to FIG. 4. The system includes: a terminal 2001 and a server 2002.

The terminal 2001 is like the terminal shown in any one of the embodiments shown in FIG. 2, FIG. 6 to FIG. 11. Reference is made to the foregoing exemplary embodiments for details, which are not described again herein.

The server 2002 is like the server shown in any one of the embodiments shown in FIG. 3, FIG. 12 to FIG. 19. Reference is made to the foregoing exemplary embodiments for details, which are not described again herein.

It should be noted that when the terminal and the server provided in the foregoing embodiments implement video-based check-in, description is made only through examples of division of the functional modules. In an actual application, the functions may be assigned according to needs to be implemented by different functional modules, that is, the internal structure of the device is divided into different functional modules, so as to implement all or a part of the functions described above. Furthermore, the embodiments of the terminal, the server and the system provided by the embodiments belong to the same idea as the embodiment of the video-based check-in method, and the method embodiment may serve as a reference for details of a specific implementation process thereof, which are not repeated herein.

The sequence numbers of the preceding embodiments of the present invention are merely for description purpose but do not indicate the preference of the embodiments.

Persons of ordinary skill in the art may understand that all or a part of the steps of the foregoing embodiments may be implemented through hardware, or may be implemented by a program instructing relevant hardware. The program may be stored in a computer readable storage medium. The storage medium may be a read-only memory, a magnetic disk, or an optical disc.

The foregoing descriptions are merely exemplary embodiments of the present invention, but are not intended to limit the present disclosure. Any modification, equivalent replacement, or improvement derived within the spirit and principle of the present disclosure shall fall within the protection scope of the present disclosure.

What is claimed is:

1. A video-based check-in method, performed by a terminal, comprising:

obtaining a check-in instruction to begin a check-in session by detecting a shaking action of the terminal while displaying a currently played video in the terminal;

collecting, by the terminal, at least two video image segments corresponding to the currently played video in the terminal during the check-in session according to the check-in instruction;

determining time information for each of the at least two video image segments wherein the time information for each of the at least two video image segments comprises start time and end time of each of the at least two video image segments;

sending the at least two video image segments and the time information corresponding to the at least two video image segments to a server for verification;

receiving a webpage including at least one of a check-in option corresponding to the video or a check code corresponding to the video sent after the server determines that the at least two video image segments received from the terminal is consistent with multimedia data of the video identified by the start time and the end time of each of the at least two video image segments as received by the server together with the at least two video image segments; and opening the webpage to select the check-in option in the webpage or sending the check code to the server, to complete check-in on the video and to close the check-in session.

2. The method according to claim 1, further comprising:

obtaining user information corresponding to a user, and submitting the user information to the server, so that the server updates statistical data related to the video according to the user information.

3. The method according to claim 2, wherein after the submitting the user information to the server, the method further comprises:

receiving friend information returned by the server according to the user information, the friend information comprising check-in information corresponding to a friend, in a friend relationship chain of the user, who has performed check-in on the video; and displaying the friend information.

4. The method according to claim 1, wherein after completing check-in on the video, the method further comprises:

receiving comment information of the video returned by the server, the comment information being comment information published by a user who has performed check-in on the video.

5. The method according to claim 1, wherein after completing check-in on the video, the method further comprises:

obtaining comment information published by a user on the video; and submitting the comment information to the server, so that the server delivers the comment information to a terminal corresponding to a friend, in a friend relationship chain of the user, who has performed check-in on the video.

6. A video-based check-in method, performed by a server, comprising:

receiving at least two video image segments sent by a terminal during a check-in session and time information for each of the at least two video image segments, the at least two video image segments being multimedia data corresponding to a currently played video in the terminal and collected by the terminal according to a check-in instruction detected as a shaking action of the terminal while displaying the currently played video, and the time information for each of the at least two video image segments comprising start time and end time of each of the at least two video image segments;

determining whether the at least two video image segments received from the terminal is consistent with the multimedia data of the video identified by the start time and the end time of each of the at least two video image segments; and sending, when it is determined that the at least two video image segments received from the terminal is consistent with the multimedia data of the video identified by the start time and the end time of each of the at least two video image segments as received by the server together with the at least two video image segments, a webpage including at least one of a check-in option corresponding to the video or a check code corresponding to the video to the terminal so that the terminal opens the webpage to select the check-in option in the webpage or send a check code to the server to complete check-in on the video and to close the check-in session.

7. The method according to claim 6, further comprising:
receiving user information submitted by the terminal, and updating statistical data related to the video according to the user information;
obtaining a friend relationship chain of a user corresponding to the terminal according to the user information;
determining friend information corresponding to a friend in the friend relationship chain who has performed check-in on the video, the friend information comprising check-in information corresponding to the friend, in the friend relationship chain of the user corresponding to the terminal, who has performed check-in on the video; and
sending the friend information to the terminal.

8. The method according to claim 6, wherein after the sending the webpage including the check-in option corresponding to the video or the check code corresponding to the video to the terminal, the method further comprises:
returning comment information of the video to the terminal, the comment information being comment information published by a user who has performed check-in on the video.

9. The method according to claim 6, wherein after the sending the webpage including the check-in option corresponding to the video or the check code corresponding to the video to the terminal, the method further comprises:
receiving comment information on the video obtained by the terminal after check-in is performed on the video; and
delivering the comment information to a terminal corresponding to a friend, in a friend relationship chain of a user corresponding to the terminal, who has performed check-in on the video.

10. A video-based check-in terminal, comprising a processor and a non-transitory computer readable medium having a plurality of computer readable instructions stored thereon that, when executed by the processor, cause the processor to:

obtain a check-in instruction to begin a check-in session by detecting a shaking action of the terminal while displaying a currently played video in the terminal;
collect, by the terminal, at least two video image segments corresponding to the currently played video in the terminal during the check-in session according to the check-in instruction;
determine time information for each of the at least two video image segments wherein the time information for each of the at least two video image segments comprises start time and end time of each of the at least two video image segments;
send the at least two video image segments and the time information corresponding to the at least two video image segments to a server for verification;
receive a webpage including at least one of a check-in option corresponding to the video or a check code corresponding to the video sent after the server determines that the at least two video image segments received from the terminal is consistent with multimedia data of the video identified by the start time and the end time of each of the at least two video image segments as received by the server together with the at least two video image segments; and
opening the webpage to select the check-in option in the webpage or sending the check code to the server, to complete check-in on the video and to close the check-in session.

11. The terminal according to claim 10, the computer readable instructions further cause the processor to:
obtain user information corresponding to a user; and
submit the user information to the server, so that the server updates statistical data related to the video according to the user information.

12. The terminal according to claim 11, the computer readable instructions further cause the processor to:
receive friend information returned by the server according to the user information, the friend information comprising check-in information corresponding to a friend, in a friend relationship chain of the user, who has performed check-in on the video; and
display the friend information.

13. The terminal according to claim 10, the computer readable instructions further cause the processor to:
obtain comment information published by a user on the video; and
submit the comment information to the server, so that the server delivers the comment information to a terminal corresponding to a friend, in a friend relationship chain of the user, who has performed check-in on the video.

14. A video-based check-in server, comprising a processor and a non-transitory computer readable medium having a plurality of computer readable instructions stored thereon that, when executed by the processor, cause the processor to:
receive at least two video image segments sent by a terminal during a check-in session and time information for each of the at least two video image segments, the at least two video image segments being multimedia data corresponding to a currently played video in the terminal and collected by the terminal according to a check-in instruction detected as a shaking action of the terminal while displaying the currently played video, and the time information for each of the at least two video image segments comprising start time and end time of each of the at least two video image segments;

determine whether the at least two video image segments received from the terminal is consistent with the multimedia data of the video identified by the start time and the end time of each of the at least two video image segments; and send, when it is determined that the at least two video image segments received from the terminal is consistent with the multimedia data of the video identified by the start time and the end time of each of the at least two video image segments as received by the server together with the at least two video image segments, a webpage including at least one of a check-in option corresponding to the video or a check code corresponding to the video to the terminal so that the terminal opens the webpage to select the check-in option in the webpage or send a check code to the server to complete check-in on the video and to close the check-in session.

15. The server according to claim 14, wherein the computer readable instructions further cause the processor to:

receive user information submitted by the terminal, and update statistical data related to the video according to the user information;

obtain a friend relationship chain of a user corresponding to the terminal according to the user information;

determine friend information corresponding to a friend in the friend relationship chain who has performed check-in on the video; and send the friend information to the terminal, the friend information comprising check-in information corresponding to the friend, in the friend relationship chain of the user corresponding to the terminal, who has performed check-in on the video.

* * * * *